(12) United States Patent  
Asami

(10) Patent No.: US 8,184,384 B2  
(45) Date of Patent: May 22, 2012

(54) IMAGING LENS AND IMAGING APPARATUS

(75) Inventor: Taro Asami, Saitama (JP)

(73) Assignee: Fujifilm Corporation, Tokyo (JP)

( * ) Notice: Subject to any disclaimer, the term of this patent is extended or adjusted under 35 U.S.C. 154(b) by 233 days.

(21) Appl. No.: 12/750,079

(22) Filed: Mar. 30, 2010

(65) Prior Publication Data

US 2010/0246029 A1 Sep. 30, 2010

(30) Foreign Application Priority Data

Mar. 31, 2009 (JP) .................................. P2009-83880

(51) Int. Cl.
*G02B 3/02* (2006.01)
*G02B 13/18* (2006.01)

(52) U.S. Cl. ....................................... 359/715; 359/771

(58) Field of Classification Search .................. 359/708, 359/713–715, 754–758, 761–765, 770–772, 359/774, 775, 781
See application file for complete search history.

(56) References Cited

U.S. PATENT DOCUMENTS

| | | | |
|---|---|---|---|
| 5,680,259 A | 10/1997 | Yamada | |
| 7,280,289 B2 | 10/2007 | Yamakawa | |
| 7,375,906 B2 | 5/2008 | Hirose et al. | |
| 7,405,890 B2 | 7/2008 | Nakamura | |
| 7,446,955 B1 * | 11/2008 | Noda | 359/781 |
| 7,518,809 B2 | 4/2009 | Yamakawa et al. | |
| 7,551,373 B2 | 6/2009 | Hirose | |
| 7,872,811 B2 * | 1/2011 | Iyama | 359/717 |
| 2008/0239517 A1 | 10/2008 | Mori | |
| 2009/0122422 A1 | 5/2009 | Yoshida et al. | |
| 2010/0259632 A1 * | 10/2010 | Matsusaka et al. | 348/222.1 |

FOREIGN PATENT DOCUMENTS

| | | |
|---|---|---|
| JP | 9-15492 A | 1/1997 |
| JP | 2002-244031 A | 8/2002 |
| JP | 2005-227429 A | 8/2005 |
| JP | 2006-259704 A | 9/2006 |
| JP | 2006-292988 A | 10/2006 |
| JP | 2006-301222 A | 11/2006 |
| JP | 2007-94032 A | 4/2007 |
| JP | 2007-101920 A | 4/2007 |
| JP | 2007-133324 A | 5/2007 |
| JP | 2007-206516 A | 8/2007 |
| JP | 2008-164989 A | 7/2008 |
| JP | 2008-242040 A | 10/2008 |
| JP | 2008-268268 A | 11/2008 |
| JP | 2008-276185 A | 11/2008 |
| JP | 2008-281859 A | 11/2008 |
| JP | 2009-3343 A | 1/2009 |

(Continued)

*Primary Examiner* — Darryl J Collins
(74) *Attorney, Agent, or Firm* — Birch, Stewart, Kolasch & Birch, LLP

(57) ABSTRACT

An imaging lens is provided and includes: in order from the object side, a first lens having a concave surface on an image side thereof; a second lens of a negative lens having a concave surface on the image side and having at least one aspheric surface; a third lens having at least one aspheric surface; and a fourth lens of a positive lens having a convex surface on the image side and having at least one aspheric surface. A stop is disposed between the third lens and the fourth lens. In addition, assuming that a focal length of the whole system is f and a focal length of the first lens L1 is f1, the following Conditional Expression (1) is satisfied.

$$15.0 < |f1/f| \qquad (1)$$

11 Claims, 19 Drawing Sheets

FOREIGN PATENT DOCUMENTS

| | | |
|---|---|---|
| JP | 2009-8867 A | 1/2009 |
| JP | 2009-80507 A | 4/2009 |
| JP | 2009-265338 A | 11/2009 |
| JP | 2009-265354 A | 11/2009 |
| JP | 2009-282484 A | 12/2009 |
| JP | 2010-14855 A | 1/2010 |
| JP | 2010-15004 A | 1/2010 |
| JP | 2010-15007 A | 1/2010 |
| WO | WO 2009/025311 A1 | 2/2009 |

* cited by examiner

EXAMPLE 2

EXAMPLE 3

EXAMPLE 4

EXAMPLE 5

EXAMPLE 6

EXAMPLE 7

FIG. 10
EXAMPLE 1
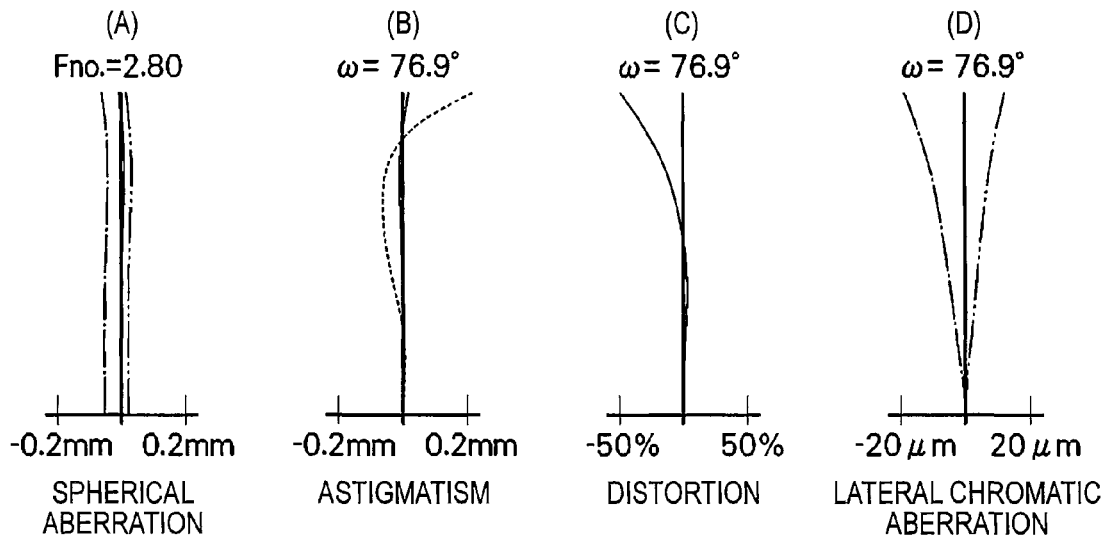
(A) Fno.=2.80 — SPHERICAL ABERRATION (-0.2mm to 0.2mm)
(B) ω=76.9° — ASTIGMATISM (-0.2mm to 0.2mm)
(C) ω=76.9° — DISTORTION (-50% to 50%)
(D) ω=76.9° — LATERAL CHROMATIC ABERRATION (-20μm to 20μm)
— d-LINE
--- F-LINE
---- C-LINE
— SAGITTAL
---- TANGENTIAL
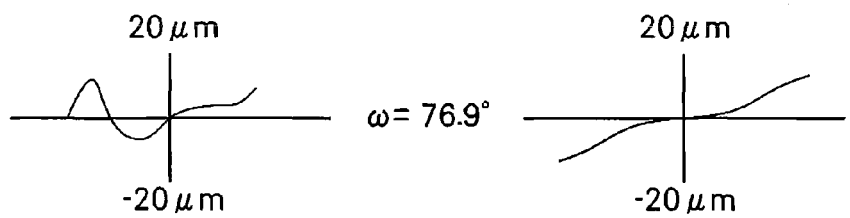
ω=76.9°
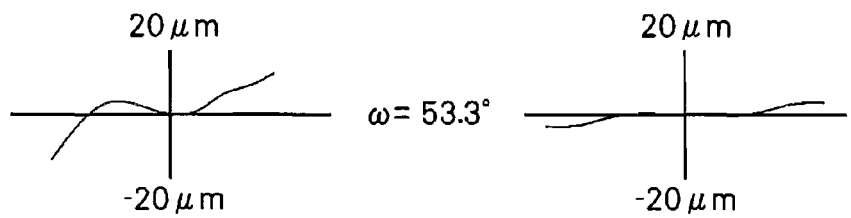
ω=53.3°
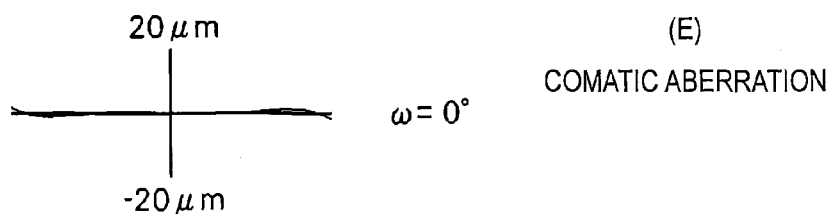
ω=0°
(E) COMATIC ABERRATION

FIG. 13
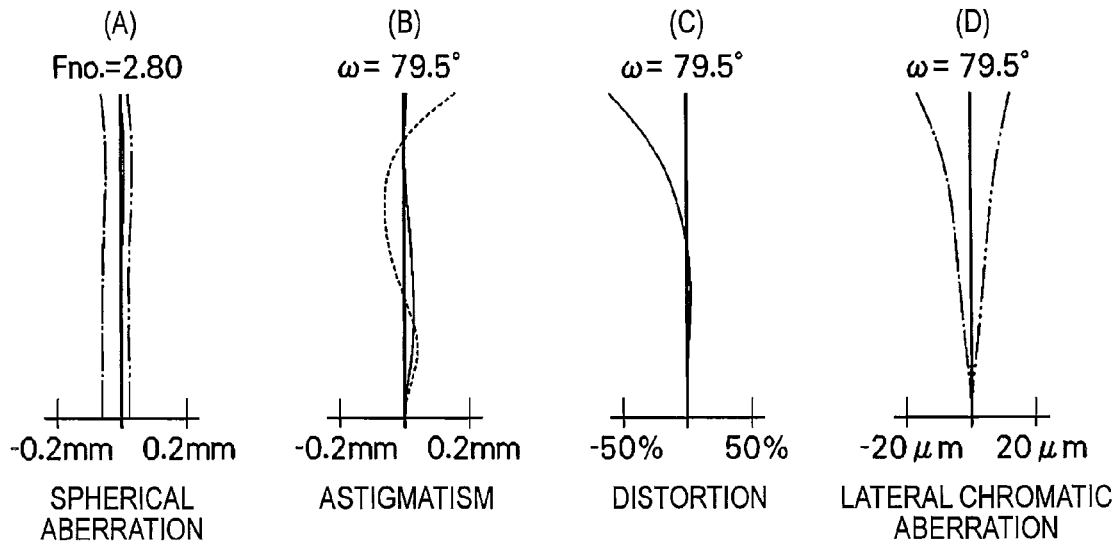
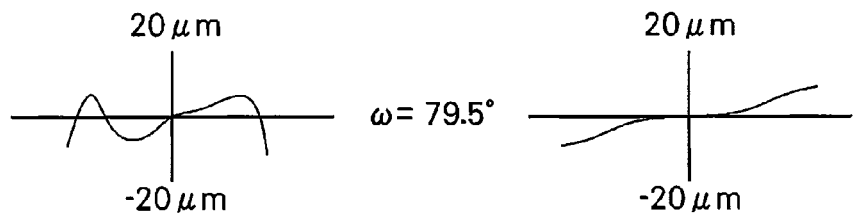
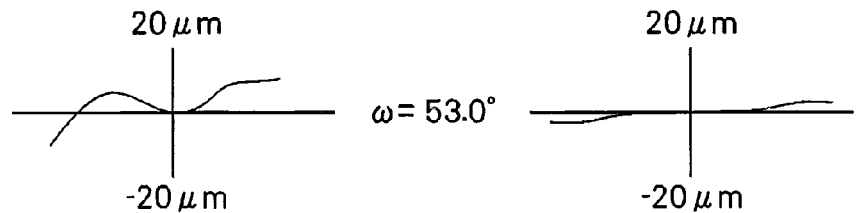
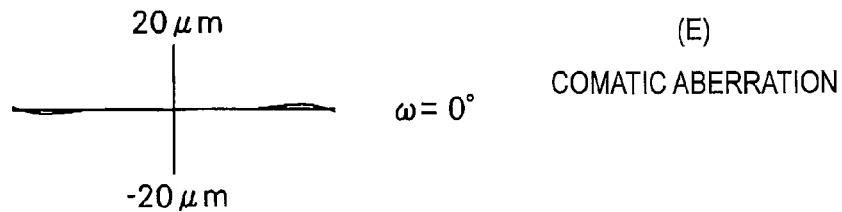

IMAGING LENS AND IMAGING APPARATUS

This application is based on and claims priority under 35 U.S.C §119 from Japanese Patent Application No. 2009-083880, filed on Mar. 31, 2009, the entire disclosure of which is herein incorporated by reference.

BACKGROUND OF THE INVENTION

1. Field of the Invention

The present invention relates to an imaging lens and an imaging apparatus, more particularly, to an imaging lens suitable to be used in a surveillance camera, a camera for portable terminal, an on-board camera, and the like employing an imaging device such as a CCD (Charge Coupled Device) and a CMOS (Complementary Metal Oxide Semiconductor), and an imaging apparatus having the imaging lens.

2. Description of Related Art

Recently, imaging devices such as CCD and CMOS have been to a great extent miniaturized and the number of pixels thereof excessively increased. In addition, an imaging apparatus main body having the imaging device has also been miniaturized, and thus it is also required not only to achieve a favorable optical performance but also to achieve weight reduction and miniaturization of an imaging lens mounted therein.

On the other hand, it is required for on-board cameras, surveillance cameras, and the like to have, for example, a wide angle lens, of which a total angle of view is larger than 130 degrees, with high antiweatherability, a small size, and high performance.

In this field, known imaging lenses having a small number of lenses include, for example, the lens systems disclosed in JP-A-2002-244031, JP-A-2006-259704 and JP-A-2007-133324. JP-A-2002-244031 and JP-A-2006-259704 disclose an imaging lens configured to include four elements. JP-A-2007-133324 discloses a lens unit formed of an imaging lens configured to include three elements and a glass protective plate disposed on the object side thereof.

In the imaging lenses used in the imaging apparatuses in the above-mentioned field, the first lens disposed closest to the object side may be made of glass in order to increase antiweatherability. Generally, the diameter of the first lens is larger than those of other lenses. In particular, in wide angle lenses, heights of rays incident on the first lens are large. Hence, the diameter of the first lens is essentially large.

However, if the first lens with a large diameter is made of glass, costs thereof increase. In the imaging lenses in the above-mentioned field, not only the demands for miniaturization, high performance, and an increase in angle of view but also the demand for low cost has become stronger. Recently, the demands have become stronger and stronger. In order to achieve low cost, it is of great importance, for example, to increase an allowance for manufacturing errors.

In the lens systems disclosed in JP-A-2002-244031 and JP-A-2006-259704, the power of the first lens is strong. Hence, it is difficult to stabilize performance reliably when increasing the allowances for manufacturing errors. As a result, it is difficult to achieve low cost.

In the lens unit disclosed in JP-A-2007-133324, it is possible to expect improvement in antiweatherability by employing a protective plate. However, this configuration is insufficient for an increase in angle of view of the imaging lens itself.

SUMMARY OF THE INVENTION

An object of the invention is to provide an imaging lens which has a favorable optical performance, a small size, and a wide angle, and can be manufactured with low cost. Another object of the invention is to provide an imaging apparatus having the imaging lens.

According to an aspect of the invention, an imaging lens includes: in order from an object side of the imaging lens: a first lens having a concave surface on an image side thereof; a second lens of a negative lens having a concave surface on the image side and having at least one aspheric surface; a third lens having at least one aspheric surface; and a fourth lens of a positive lens having a convex surface on the image side and having at least one aspheric surface. A stop is disposed between the third lens and the fourth lens. Assuming that a focal length of the whole system is f and a focal length of the first lens is f1, the following Conditional Expression (1) is satisfied.

$$15.0 < |f1/f| \quad (1)$$

Furthermore, the "concave" and "convex" surfaces are assumed as paraxial regions relative to the aspheric surface.

Furthermore, in the first lens of the imaging lens according to the aspect of the invention, the image side surface has only to be concave. For example, the first lens may be formed as a meniscus lens having a refractive power, a meniscus lens of which the object side surface and the image side surface has the same radius of curvature, a plano-concave lens, or a biconcave lens.

The imaging lens according to the aspect of the invention has a small number of lenses, for example, the minimum four lenses, and thus it is possible to achieve low costs and a small size. In addition, the aspheric surfaces are formed on the respective second to fourth lenses, and the configuration of the lenses is appropriately selected, and thus it is possible to achieve miniaturization and a wide angle while securing high performance with a small number of lenses, for example, the minimum four lenses. Further, in particular, in the imaging lens according to the aspect of the invention, the power of the first lens is set to be small so that Conditional Expression (1) is satisfied. Hence, it is possible to increase allowances for manufacturing errors and assembly errors of the first lens. As a result, it is possible to manufacture the system with low cost.

In the imaging lens according to the aspect of the invention, assuming that a refractive index of the first lens at the d-line is N1, it is preferable to satisfy the following Conditional Expression (2).

$$N1 \leq 1.7 \quad (2)$$

Further, in the imaging lens according to the aspect of the invention, assuming that an Abbe number of the first lens at the d-line is v1, it is preferable to satisfy the following Conditional Expression (3).

$$v1 < 60 \quad (3)$$

Furthermore, in the imaging lens according to the aspect of the invention, assuming that a composite focal length of the first lens and the second lens is f12 and a composite focal length of the third lens and the fourth lens is f34, it is preferable to satisfy the following Conditional Expression (4).

$$0.2 < |f12/f34| < 1.0 \quad (4)$$

Further, in the imaging lens according to the aspect of the invention, assuming that a focal length of the second lens is f2, it is preferable to satisfy the following Conditional Expression (5).

$$5.0 < |f1/f2| \quad (5)$$

Furthermore, in the imaging lens according to the aspect of the invention, it is preferable that the image side surface of the second lens should have a shape in which the surface has a negative power at a center thereof and the image side surface at an effective diameter edge has a smaller negative power than that at the center.

Further, in the imaging lens according to the aspect of the invention, assuming that an absolute value of a radius of curvature of the image side surface of the second lens at the center is |R4| and an absolute value of a radius of curvature of the image side surface of the second lens at the effective diameter edge is |RX4|, it is preferable to satisfy the following Conditional Expression (6).

$$2.0<|RX4|/|R4| \quad (6)$$

Furthermore, in the aspect of the invention, the "effective diameter of a surface" is defined as a diameter of the circle formed of points of intersection between a lens surface and rays, which pass through the outermost side (a position farthest from the optical axis) of the lens surface, among the effective rays which pass through the lens surface, when the optical system is rotationally symmetric about the optical axis. Here, the effective rays are defined as rays which are used to form an image and include all of the on-axis effective rays and the off-axis effective rays. Consequently, in the aspect of the invention, the "effective diameter edge of a surface" is defined as the respective points on the surface intersecting with the rays, which pass through the outermost side thereof, among the entire rays which pass through the lens surface in the range of the effective diameter.

In the aspect of the invention, the "radius of curvature at the center" is defined as a paraxial radius of curvature.

Further, in the imaging lens according to the aspect of the invention, assuming that a distance on the optical axis from an object side surface of the first lens to an imaging plane is L, it is preferable to satisfy the following Conditional Expression (7). Furthermore, at the time of calculating the distance L, a back focal length is assumed as an air conversion length.

$$8.0<L/f<13.0 \quad (7)$$

Furthermore, in the imaging lens according to the aspect of the invention, assuming that a distance on the optical axis from an image side surface of a lens closest to the image side to the imaging plane is Bf, it is preferable to satisfy the following Conditional Expression (8). The Bf corresponds to the back focal length, and at the time of calculating the Bf, the air conversion length is used.

$$1.0<Bf/f<2.5 \quad (8)$$

Furthermore, in the imaging lens according to the aspect of the invention, assuming that a center thickness of the first lens is D1, it is preferable to satisfy the following Conditional Expression (9).

$$0.9<D1 \quad (9)$$

According to another aspect of the invention, an imaging apparatus includes the imaging lens according to the aspect of the invention.

In the lens system, which includes the minimum four lenses, according to the aspect of the invention, by forming aspheric surfaces, the configuration of the shapes and powers of the respective lenses, the position of the aperture diaphragm and the like are appropriately set so as to satisfy Conditional Expression (1). With such a configuration, it is possible to provide an imaging lens which has a favorable optical performance, a small size, and a wide angle, and can be manufactured with low cost, and it is also possible to provide an imaging apparatus having the imaging lens.

BRIEF DESCRIPTION OF THE DRAWINGS

The features of the invention will appear more fully upon consideration of the exemplary embodiment of the invention, which are schematically set forth in the drawings, in which:

FIG. 10 is diagrams illustrating various diagrams of the imaging lens according to Example 1 of the invention;

FIG. 13 is diagrams illustrating various diagrams of the imaging lens according to Example 4 of the invention;

DETAILED DESCRIPTION OF THE EXEMPLARY EMBODIMENTS

Hereinafter, exemplary embodiments of the invention will be described in detail with reference to the accompanying drawings.

(Embodiment of Imaging Lens)

Figure 1:
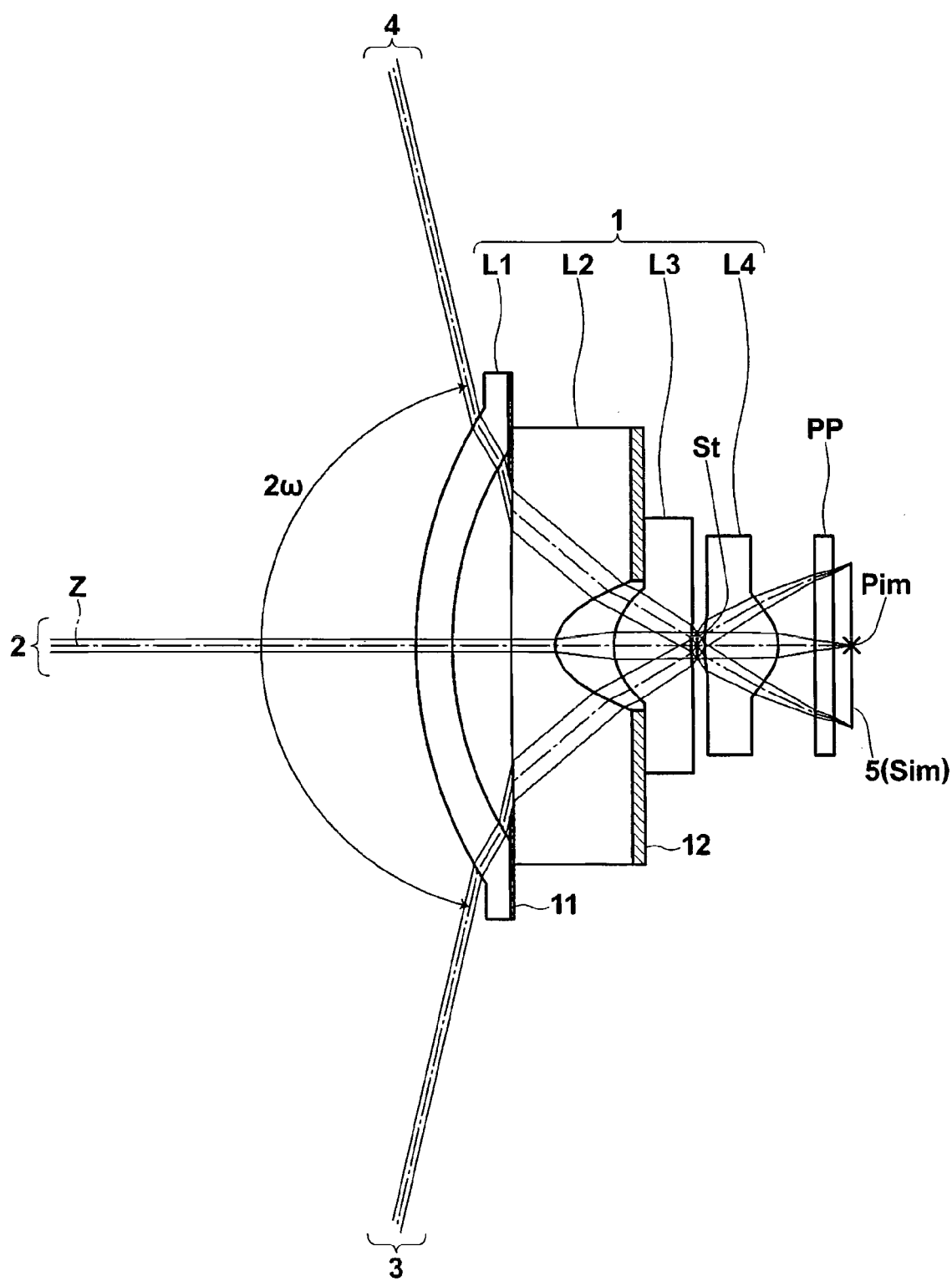
FIG. 1 is a ray tracing diagram of an imaging lens according to an exemplary embodiment of the invention.

FIG. 1 shows a lens sectional view of an imaging lens 1 according to an exemplary embodiment of the invention. In FIG. 1, the left side of the drawing is the object side, and the right side is the image side, and the on-axis rays 2 from the object point at the infinite distance and the off-axis rays 3 and 4 at the total angle of view 2ω are shown together.

In FIG. 1, considering that the imaging lens 1 is applied to an imaging apparatus, an imaging device 5, which is disposed on an imaging plane Sim including an image point Pim of the imaging lens 1, is shown. The imaging device 5 converts an optical image, which is formed by the imaging lens 1, into an electric signal, in which for example a CCD image sensor, a CMOS image sensor, and the like may be used.

Furthermore, when the imaging lens 1 is applied to an imaging apparatus, it is preferable that a cover glass, a low pass filter, an infrared cut filter, or the like be provided in accordance with a configuration of the camera side equipped with the lens system. FIG. 1 shows an example in which an optical member PP having a plane parallel plate shape assuming the above is disposed between the lens closest to the image side and the imaging device 5 (the imaging plane Sim).

The imaging lens 1 includes, in order from an object side: a first lens L1 of which an image side surface is concave; a negative second lens L2 of which an image side surface is concave and at least one surface is aspheric; a third lens L3 of which at least one surface is aspheric; an aperture diaphragm St as an exemplary embodiment of a stop; and a positive fourth lens L4 of which an image side surface is convex and at least one surface is aspheric. Furthermore, the aperture diaphragm St shown in FIG. 1 does not illustrate a shape and a size thereof, but illustrates a position thereof on the optical axis Z.

Since the imaging lens 1 is formed of a small number of lenses, for example, four lenses, it is possible to achieve low costs and a decrease in total length of the system in the direction of the optical axis. Further, since at least one surface of each of the second lens L2 to the fourth lens L4 is formed to be aspheric, the lens system has a small number of lenses, that is, four lenses, while it is possible to obtain a fine image in which spherical aberration, field curvature, and comatic aberration are corrected.

In the imaging lens 1, the image side surface of the first lens L1 is formed to be concave. If the image side surface of the first lens L1 is formed to be convex, it becomes difficult for the first lens L1 to have a negative power, and thus it becomes difficult to increase an angle of view. Although an increase in angle of view is achieved, angles of marginal rays incident on the first lens L1 increase, and thus a reflectance thereof increases, thereby lowering a relative illumination thereof. For this reason, the image side surface of the first lens L1 is formed to be concave, and thus it becomes easy to increase an angle of view, and it is also possible to suppress the angles of rays incident on the surface. As a result, it is possible to prevent the relative illumination from being lowered.

Since the fourth lens L4 is formed as a lens which is convex toward the image side and has a positive power, it is possible to correct field curvature satisfactorily.

By providing the aperture diaphragm St between the third lens L3 and the fourth lens L4, it is possible to miniaturize the lens system in the diameter direction.

Furthermore, in the imaging lens 1, assuming that a focal length of the whole system is f and a focal length of the first lens L1 is f1, Conditional Expression (1) is satisfied.

$$15.0<|f1/f| \tag{1}$$

By satisfying Conditional Expression (1), it is possible to decrease the power of the first lens L1 relative to the power of the whole system, and it is also possible to relax sensitivity to the performance of the first lens L1. Thereby, it is possible to increase allowances for manufacturing errors and assembly errors. As a result, it is possible to manufacture the system with low cost.

Further, since the first lens L1 satisfies Conditional Expression (1) and the second lens L2 is formed as a lens having a negative power, it is possible to achieve an increase in angle of view throughout the whole lens system.

When used for on-board cameras, surveillance cameras, and the like, it is preferable that the first lens L1 disposed closest to the object side should be made of a material which is hard and resistant to shock. In the embodiment of the invention, the power of the first lens L1 is decreased so that the first lens L1 satisfies Conditional Expression (1). Hence, even when using a material having a small Abbe number in Conditional Expressions (3-2) and (3-3) to be described later, it is possible to suppress deterioration in chromatic aberration. That is, in the embodiment of the invention, a wide choice of materials is provided for the first lens L1, and thus it is possible to manufacture a lens resistant to various kinds of shock with low cost by employing a low-cost material. In addition, even when the first lens L1 is made of plastic, it is possible to select a material resistant to various kinds of shock. As a result, it becomes easy to manufacture a lens resistant to shock with low cost.

Furthermore, by decreasing the power of the first lens L1, it is possible to relax position precision of the first lens L1. As a result, it becomes easy to replace the first lens L1. For example, when the first lens L1 is scratched or damaged by a chemical, the lens system can be recovered by replacing the first lens L1, and at this time, the lens replacement becomes easy.

In addition, by decreasing the power of the first lens L1, it is possible to reduce further the effect of performance change caused by temperature change, as compared with the case where the first lens L1 has a large power, even when the first lens L1 is made of plastic. As a result, according to the embodiment of the invention, it is advantageous to use plastic, and thus it becomes easy to reduce costs further.

Next, a preferred configuration of the imaging lens according to the embodiment of the system and the advantages thereof will be described. Further, the preferred configuration may be any one of the following configurations, or may be combination of two or more configurations selected optionally.

Assuming that a focal length of the whole system is f and a focal length of the first lens is f1, in order to manufacture the first lens L1 with lower cost, it is preferable to satisfy the following Conditional Expression (1-2).

$$50.0<|f1/f| \tag{1-2}$$

By satisfying Conditional Expression (1-2), the power of the first lens L1 decreases more, and thus it is possible to increase further allowances of manufacturing errors and assembly errors. As a result, it is possible to manufacture the system with lower cost.

Assuming that a refractive index of the material of the first lens L1 at the d-line is N1, it is preferable to satisfy the following Conditional Expression (2).

$$N1 \leq 1.7 \tag{2}$$

By satisfying Conditional Expression (2), it is possible to select a lower-cost material, and thus it is possible to manufacture the first lens L1 with lower cost.

Further, assuming that an Abbe number of the material of the first lens L1 at the d-line is ν1, it is preferable to satisfy the following Conditional Expression (3).

$$\nu 1<60 \tag{3}$$

When the result value of Conditional Expression (3) is equal to or more than the upper limit thereof, the material of the lens has a high price, and thus it causes an increase in cost.

At that time, it is more preferable that the Abbe number ν1 of the material of the first lens L1 at the d-line should satisfy the following Conditional Expression (3-1).

$$\nu 1<50 \tag{3-1}$$

By setting the Abbe number of the first lens L1 so as to satisfy the upper limit of Conditional Expression (3-1), it is possible to select a material with improved hardness as the material of the first lens L1. For example, it is possible to manufacture a lens which has an excellent shock resistance required when used as a lens for an on-board camera or a surveillance camera.

Further, it is more preferable that the Abbe number ν1 of material of the first lens L1 at the d-line should satisfy the following Conditional Expression (3-2).

$$20 < \nu 1 < 45 \tag{3-2}$$

By setting the Abbe number of the first lens L1 so as to satisfy the upper limit of Conditional Expression (3-2), it is possible to select a material with improved hardness even when plastic is used as the material of the first lens L1. For example, it is possible to manufacture a lens which has an excellent shock resistance required when used as a lens for an on-board camera or a surveillance camera. By setting the Abbe number of the first lens L1 so as to satisfy the lower limit of Conditional Expression (3-2), it is possible to suppress occurrence of chromatic aberration. Further, it is possible to suppress the cost of the material. As a result, it is possible to manufacture the lens system with lower cost.

Furthermore, it is more preferable that the Abbe number ν1 of material of the first lens L1 at the d-line should satisfy the following Conditional Expression (3-3).

$$23 < \nu 1 < 35 \tag{3-3}$$

By setting the Abbe number of the first lens L1 so as to satisfy the upper limit of Conditional Expression (3-3), it is possible to select a material with lower cost and improved hardness as the material of the first lens L1. For example, it is possible to manufacture a lens which has an excellent shock resistance required when used as a lens for an on-board camera or a surveillance camera. By setting the Abbe number of the first lens L1 so as to satisfy the lower limit of Conditional Expression (3-3), it is possible to further suppress occurrence of chromatic aberration. Further, it is possible to suppress further the cost of the material. As a result, it is possible to manufacture the lens system with lower cost.

Further, assuming that a composite focal length of the first lens L1 and the second lens L2 is f12 and a composite focal length of the third lens L3 and the fourth lens L4 is f34, it is preferable to satisfy the following Conditional Expression (4).

$$0.2 < |f12/f34| < 1.0 \tag{4}$$

When the result value of Conditional Expression (4) is equal to or more than the upper limit thereof, it becomes difficult to achieve an increase in angle of view. When the result value of Conditional Expression (4) is equal to or less than the lower limit thereof, it becomes difficult to correct comatic aberration satisfactorily.

Furthermore, it more preferable to satisfy the following Conditional Expression (4-2).

$$0.3 < |f12/f34| < 0.5 \tag{4-2}$$

When the upper limit of Conditional Expression (4-2) is satisfied, it becomes easier to achieve an increase in angle of view. When the lower limit of Conditional Expression (4-2) is satisfied, it becomes easier to correct comatic aberration satisfactorily.

Further, assuming that the focal length of the first lens L1 is f1 and a focal length of the second lens L2 is f2, it is preferable to satisfy the following Conditional Expression (5).

$$5.0 < |f1/f2| \tag{5}$$

When the result value of Conditional Expression (5) is equal to or less than the lower limit thereof, the power of the first lens L1 increases. As a result, it becomes difficult to manufacture the lens system with low cost.

Furthermore, it is more preferable to satisfy the following Conditional Expression (5-2).

$$30.0 < |f1/f2| \tag{5-2}$$

When the lower limit of Conditional Expression (5-2) is satisfied, it is possible to decrease further the power of the first lens L1. As a result, it is possible to manufacture the lens system with lower cost.

It is preferable that the object side surface of the first lens L1 should have a shape of a convex surface or a flat surface.

When the object side surface of the first lens L1 is formed as a convex surface, it is possible to see rays at a wide angle of view. Further, it is possible to suppress a reflectance of rays at a wide angle of view incident on the lens system.

Further, similarly to the fish-eye lens, a lens having an angle of view of 180 degrees or more can also be manufactured.

When the object side surface of the first lens L1 is formed as a flat surface, it is possible to see rays at a wide angle of view. In addition, it is also possible to manufacture the first lens L1 with lower cost.

Assuming that a radius of curvature of the object side surface of the first lens L1 is R1 and a radius of curvature of the image side surface of the first lens L1 is R2, it is preferable that |R1/R2| should be 1.0 or more. By setting |R1/R2| to 1.0 or more, it becomes easy to increase an angle of view of the lens system.

Further, it is more preferable that |R1/R2| should be 5.0 or more. When |R1/R2| is set to 5.0 or more, it becomes easier to increase an angle of view of the lens system.

Regarding the shape of the second lens L2, it is preferable that the image side surface of the second lens L2 should have a shape in which the surface has a negative power at the center thereof and the surface at an effective diameter edge has a smaller negative power than that at the center. By forming the image side surface of the second lens L2 in such a shape, it is possible to increase an angle of view and correct distortion satisfactorily.

Further, assuming that an absolute value of a radius of curvature of the image side surface of the second lens L2 at the center is |R4| and an absolute value of a radius of curvature of the image side surface of the second lens L2 at the effective diameter edge is |RX4|, it is preferable to satisfy the following Conditional Expression (6). By satisfying Conditional Expression (6), it is possible to correct distortion satisfactorily.

$$2.0 < |RX4|/|R4| \tag{6}$$

Figure 2:
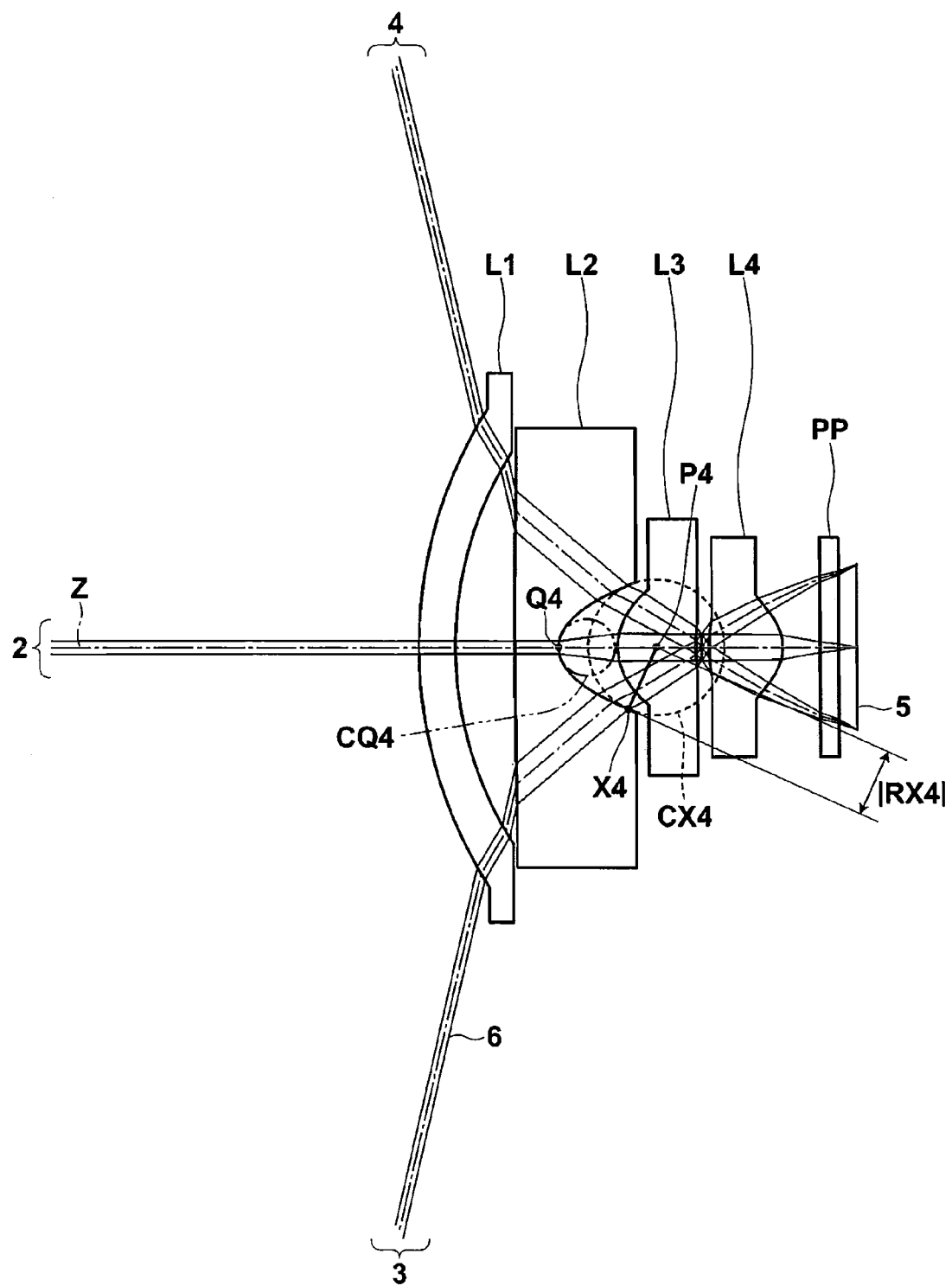
FIG. 2 is a diagram illustrating a surface shape of a first lens.
Figure 3:
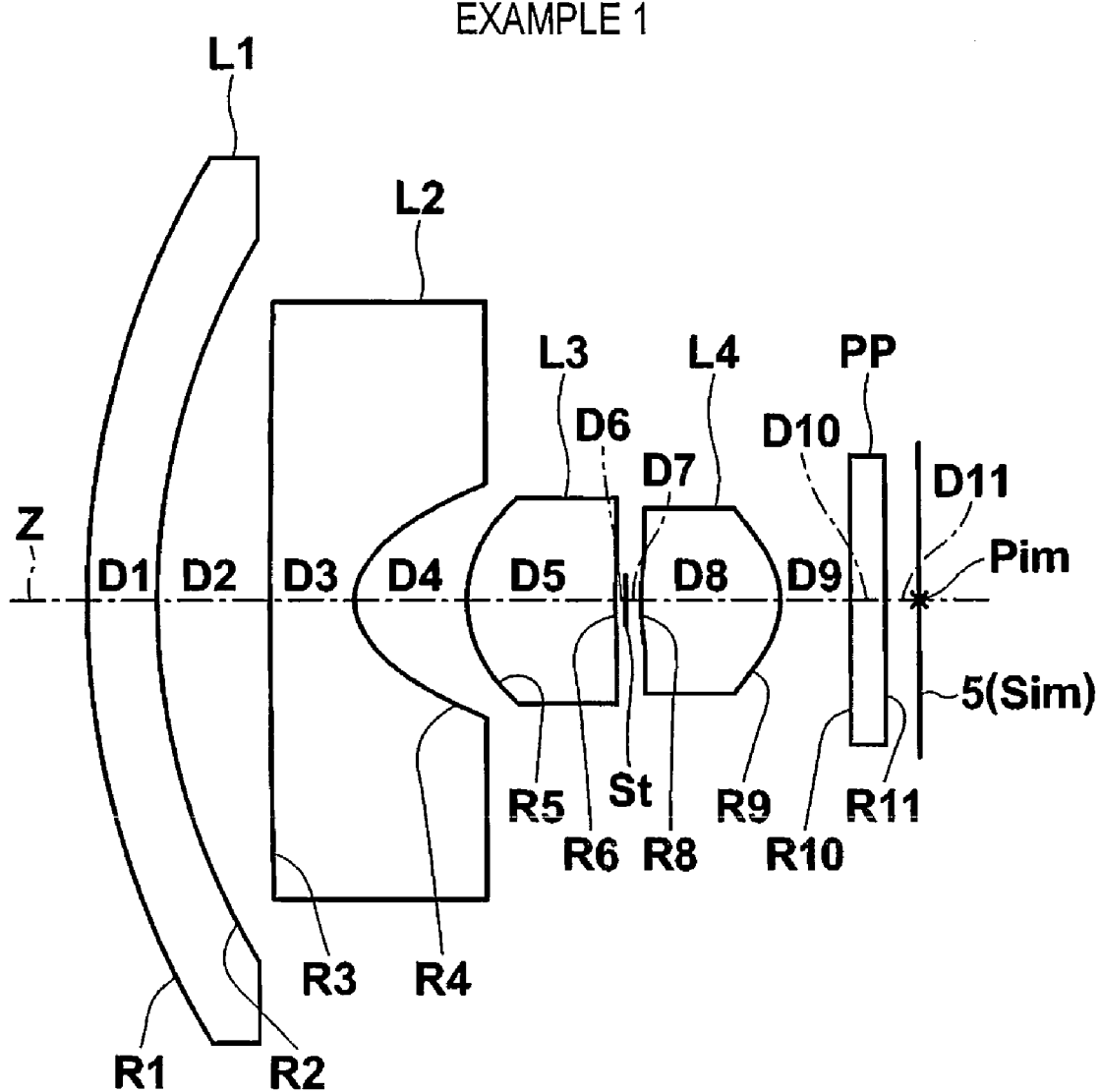
FIG. 3 is a sectional view illustrating a lens configuration of the imaging lens according to Example 1 of the invention.
Figure 4:
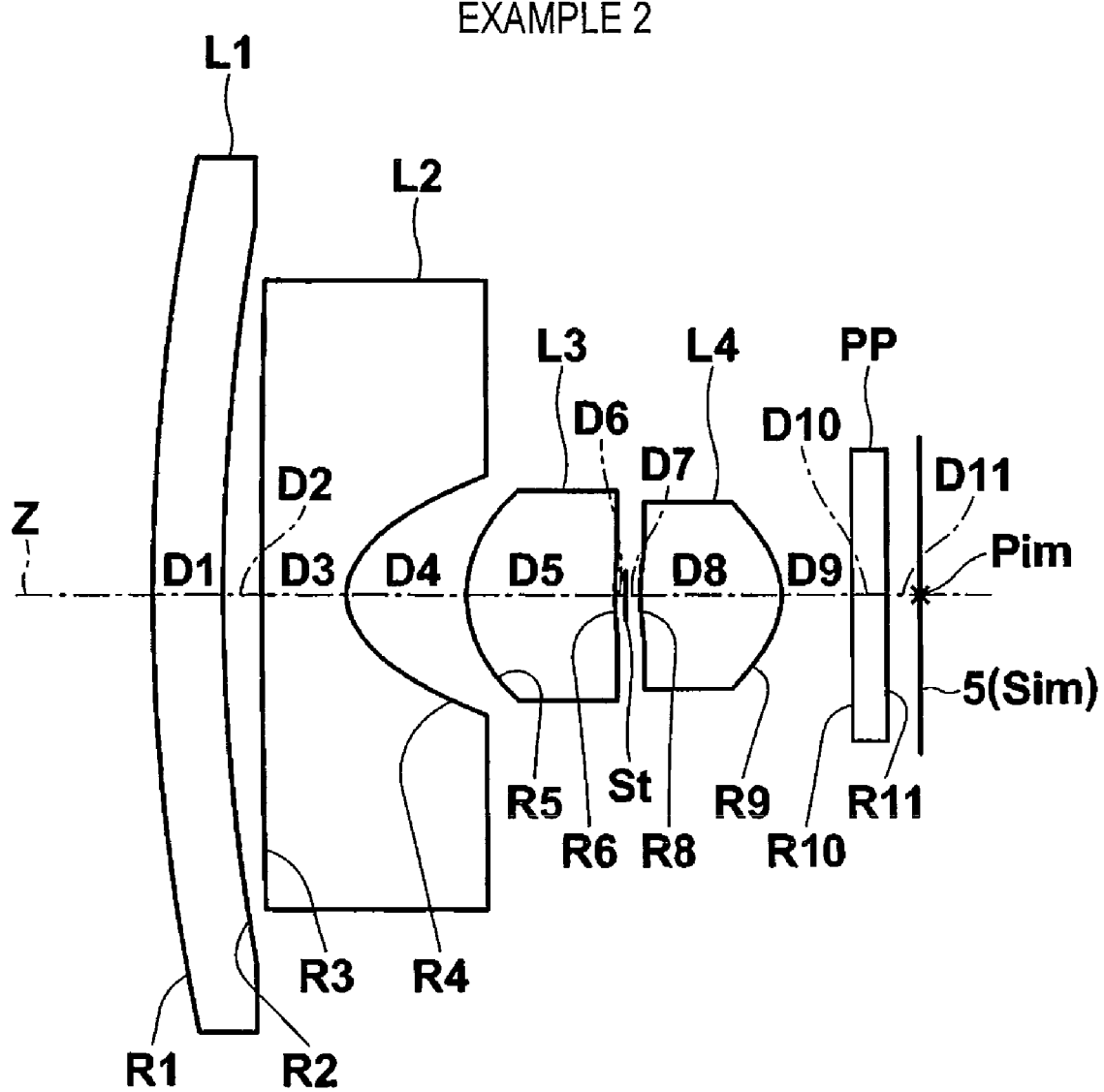
FIG. 4 is a sectional view illustrating a lens configuration of the imaging lens according to Example 2 of the invention.
Figure 5:
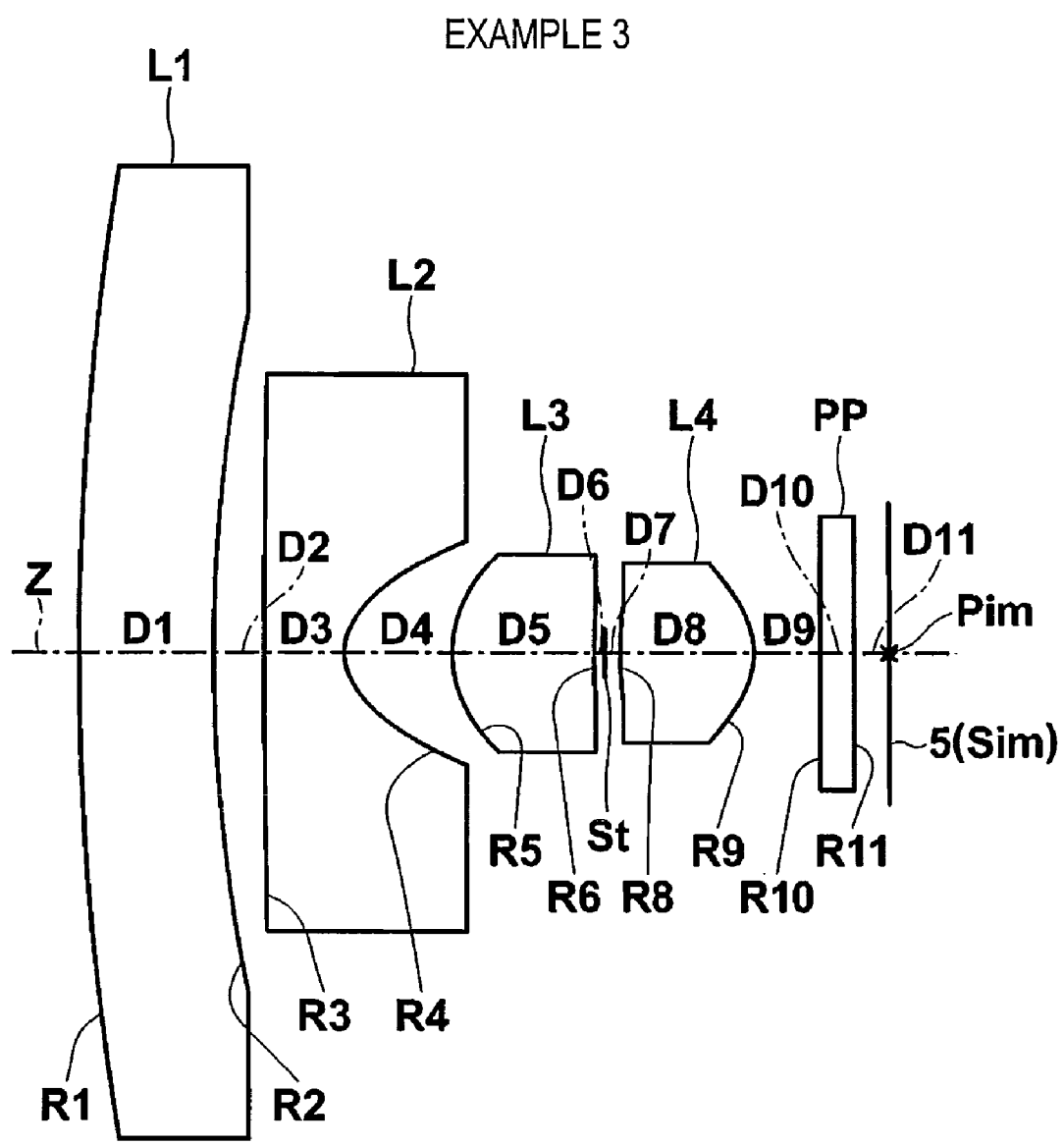
FIG. 5 is a sectional view illustrating a lens configuration of the imaging lens according to Example 3 of the invention.
Figure 6:
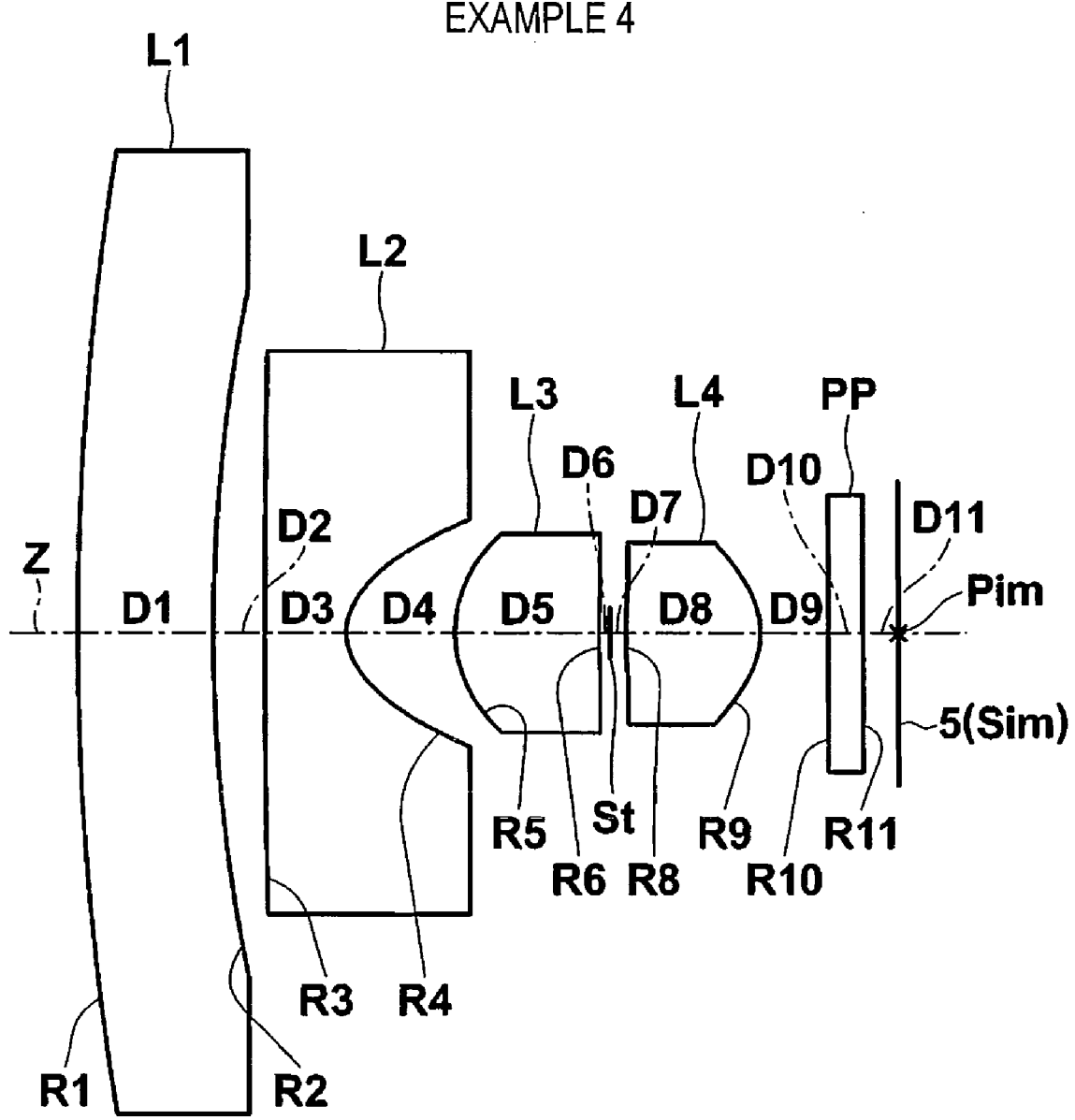
FIG. 6 is a sectional view illustrating a lens configuration of the imaging lens according to Example 4 of the invention.
Figure 7:
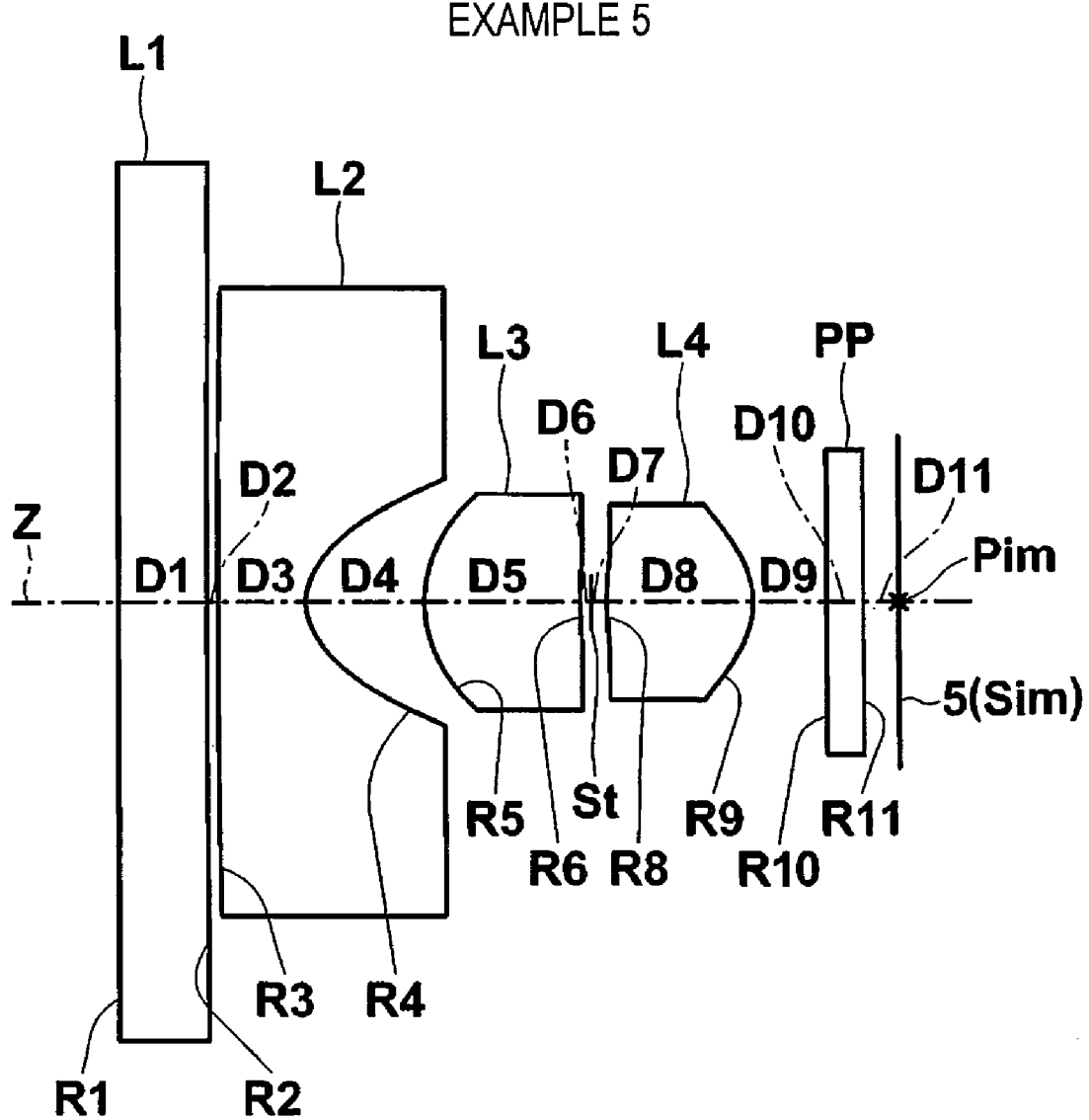
FIG. 7 is a sectional view illustrating a lens configuration of the imaging lens according to Example 5 of the invention.
Figure 8:
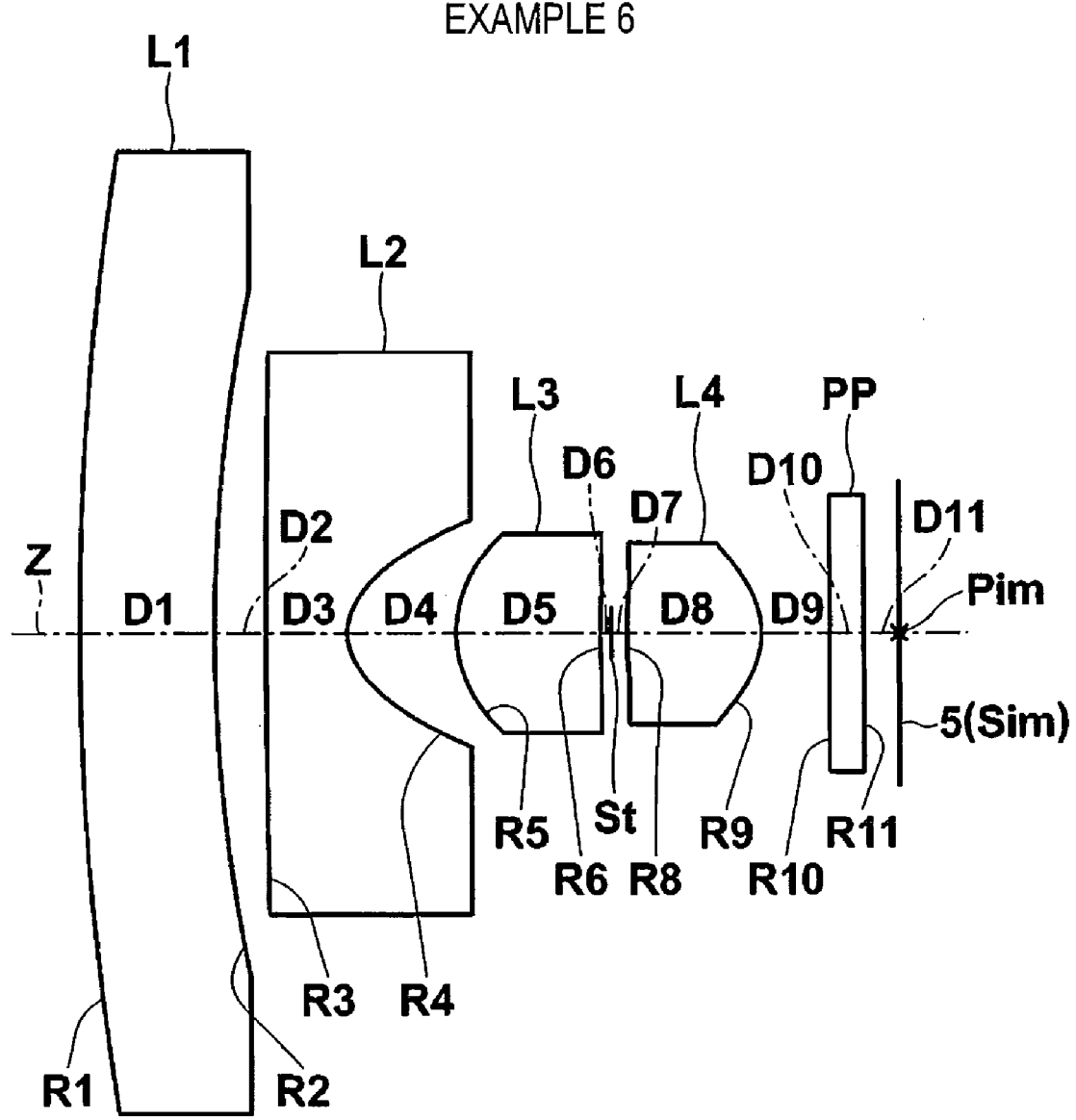
FIG. 8 is a sectional view illustrating a lens configuration of the imaging lens according to Example 6 of the invention.
Figure 9:
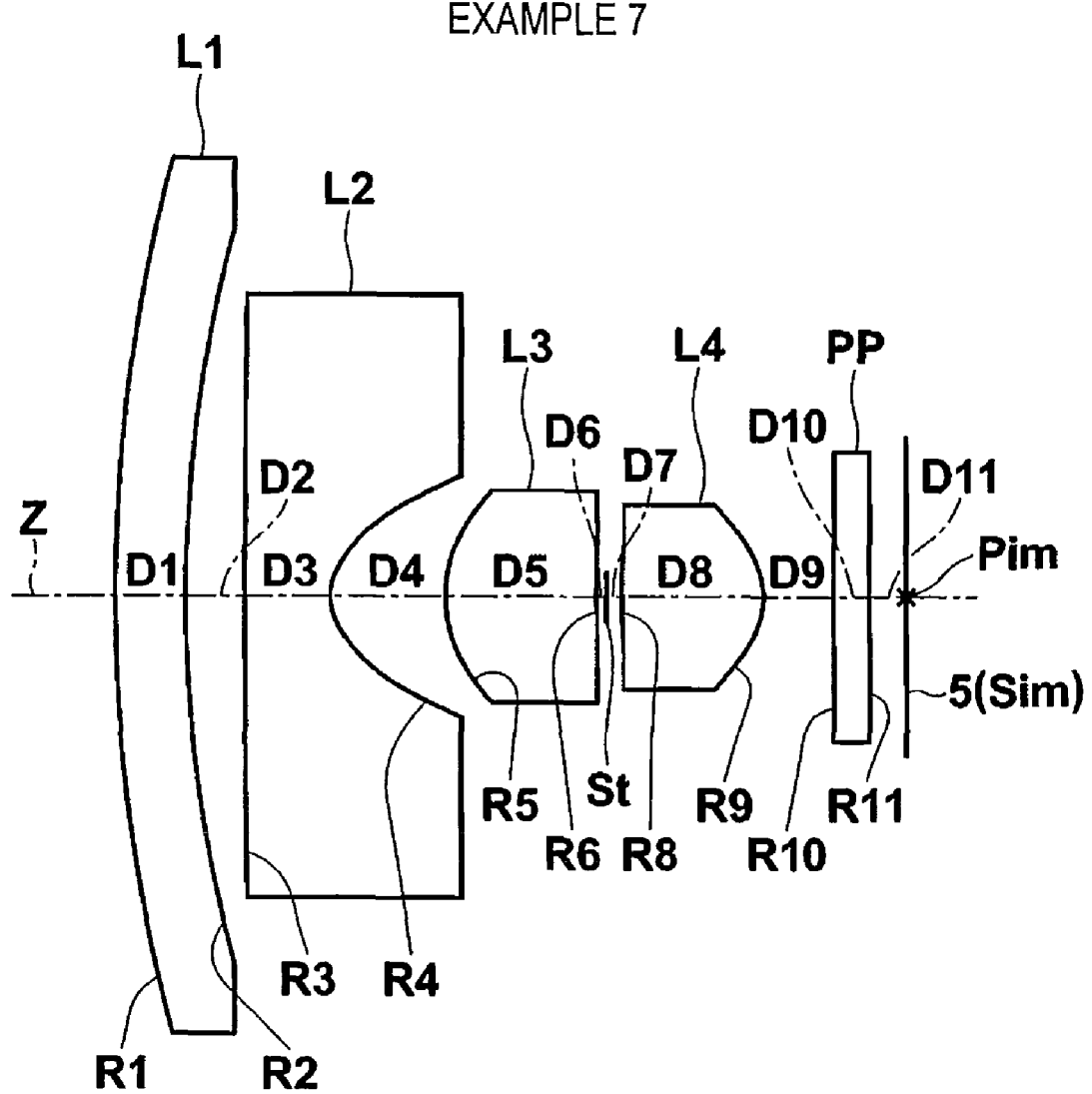
FIG. 9 is a sectional view illustrating a lens configuration of the imaging lens according to Example 7 of the invention.

The shape of the image side surface of the second lens L2 is described with reference to FIG. 2. FIG. 2 is a ray tracing diagram of the imaging lens 1, in which some signs are omitted for convenience of explanation. In FIG. 2, the point Q4 is the center of the image side surface of the second lens L2, and is an intersection point between the image side surface of the second lens L2 and the optical axis Z. The point X4 shown in FIG. 2 is a point at the effective diameter edge of the image side surface of the second lens L2, and an intersection point between the image side surface of the second lens L2 and the outermost ray 6 included in the off-axis rays 3.

In this case, the intersection point between the normal line of the lens surface at the point X4 and the optical axis Z is represented by the point P4 as shown in FIG. 2, and a length |X4-P4| of the segment connecting the point X4 and the point P4 is defined as an absolute value of a radius of curvature |RX4| at the point X4. That is, it is defined that |X4-P4| is equal to |RX4|. As described above, the length of the segment, which connects the respective points on the lens surface with the points of intersection between the optical axis and the normal lines to the lens surface at the respective points on the lens surface, is defined as the absolute value of the radius of curvature. Likewise, the radius of curvature at the point Q4 which is the center of the lens surface is represented by R4 (not shown in FIG. 2). In addition, an absolute value thereof is defined as |R4|.

In the above description, "the image side surface of the second lens L2 has a shape in which the surface has a negative power at the center thereof, and the surface at the effective diameter edge has a smaller negative power than that at the center". This means that the surface has a concave shape in a paraxial region including the point Q4 and the surface has the shape in which the point P4 is closer to the image side than the point Q4 and the |RX4| is larger than the |R4|.

Furthermore, it is preferable that the image side surface of the second lens L2 should have a shape in which the negative power thereof becomes smaller as the periphery thereof gets closer. Here, the meaning that the image side surface of the second lens L2 has "the shape in which the negative power thereof becomes smaller as the periphery thereof gets closer" is as follows. The surface has the shape in which the point P4 is closer to the image side than the point Q4 and the absolute value of the radius of curvature at each point on the lens surface becomes larger as the point gets closer to the point X4 than the point Q4 along the lens surface.

In FIG. 2, in order to make understanding easier, the circle CQ4, which passes through the point Q4 at the radius |R4| and is centered at the point on the optical axis, is represented by the chain double-dashed line, and the circle CX4, which passes through the point X4 at the radius |RX4| and is centered at the point on the optical axis, is represented by the dotted line. In addition, since the circle CX4 is larger than the circle CQ4, |R4|<|RX4| is clarified.

Furthermore, it is preferable that the shape of the image side surface of the second lens L2 should satisfy the following Conditional Expression (6-2). With such a configuration, it is possible to correct distortion further satisfactorily.

$$2.2<|RX4|/|R4| \quad (6\text{-}2)$$

It is preferable that the third lens L3 have a positive power. Further, it is preferable that the third lens L3 should be a meniscus lens.

It is preferable that the object side surface of the third lens L3 should have a shape in which the surface has a positive power at the center and the positive power becomes smaller as the periphery thereof gets closer. By setting the object side surface of the third lens L3, it is possible to correct field curvature satisfactorily.

The shape of the object side surface of the third lens L3, similarly to the shape of the image side surface of the second lens L2 described with reference to FIG. 2, can be described as follow. In the sectional view of the lens system, the effective diameter edge of the object side surface of the third lens L3 is assumed as the point X5, and the intersection point between the normal line at the point and the optical axis Z is assumed as the point P5. In this case, a length |X5-P5| of the segment connecting the point X5 and the point P5 is defined as an absolute value of a radius of curvature |RX5| at the point X5. Further, the intersection point between the object side surface of the third lens L3 and the optical axis Z, that is, the center of the object side surface of the third lens L3 is assumed as the point Q5.

In the above description, the object side surface of the third lens L3 has "the shape in which the surface has a positive power at the center thereof and the positive power becomes smaller as the periphery thereof gets closer". This means that the surface has a convex shape in the paraxial region including the point Q5. In addition, this means that the surface has the shape in which the point P5 is closer to the image side than the point Q5 and the absolute value of the radius of curvature at each point on the lens surface becomes larger as the point gets closer to the point X5 than the point Q5 along the lens surface.

Alternatively, it is preferable that the object side surface of the third lens L3 should have a shape in which the surface at the effective diameter edge has a smaller positive power than that at the center. Here, the meaning that the object side surface of the third lens L3 has "a shape in which the surface at the effective diameter edge has a smaller positive power than that at the center" is as follows. The point P5 is closer to the image side than the point Q5, and the surface has the shape in which the absolute value of the radius of curvature |RX5| at the point X5 is larger than the absolute value of the radius of curvature |R5| at the point Q5.

It is preferable that the |RX5| should be larger than 1.1 times |R5|. That is, it is preferable to satisfy 1.1<|RX5|/|R5|. In this case, it becomes easy to correct field curvature.

It is preferable that the image side surface of the third lens L3 should have a shape in which the surface has a negative power at the center and the negative power becomes larger as the periphery thereof gets closer. By setting the image side surface of the third lens L3, it is possible to correct spherical aberration satisfactorily.

The shape of the image side surface of the third lens L3, similarly to the shape of the image side surface of the second lens L2 described with reference to FIG. 2, can be described as follow. In the sectional view of the lens system, the effective diameter edge of the image side surface of the third lens L3 is assumed as the point X6, and the intersection point between the normal line at the point and the optical axis Z is assumed as the point P6. In this case, a length |X6-P6| of the segment connecting the point X6 and the point P6 is defined as an absolute value of a radius of curvature |RX6| at the point X6. Further, the intersection point between the image side surface of the third lens L3 and the optical axis Z, that is, the center of the image side surface of the third lens L3 is assumed as the point Q6.

In the above description, the image side surface of the third lens L3 has "the shape in which the surface has a negative power at the center thereof and the negative power becomes larger as the periphery thereof gets closer". This means that the surface has a concave shape in the paraxial region including the point Q6. In addition, this means that the surface has the shape in which the point P6 is closer to the image side than the point Q6 and the absolute value of the radius of curvature at each point on the lens surface becomes smaller as the point gets closer to the point X6 than the point Q6 along the lens surface.

Alternatively, it is preferable that the image side surface of the third lens L3 should have a shape in which the surface at the effective diameter edge has a larger negative power than that at the center. Here, the meaning that the image side surface of the third lens L3 has "a shape in which the surface at the effective diameter edge has a larger negative power than that at the center" is as follows. The point P6 is closer to the image side than the point Q6, and the surface has the shape in which the absolute value of the radius of curvature |RX6| at the point X6 is smaller than the absolute value of the radius of curvature |R6| at the point Q6.

It is preferable that the |RX6| should be smaller than 0.9 times |R6|. That is, it is preferable to satisfy |RX6|/|R6|<0.9. In this case, it becomes easy to correct spherical aberration.

It is preferable that the object side surface of the fourth lens L4 should have a shape in which the surface has a positive power at the center and the positive power becomes smaller as the periphery thereof gets closer. By setting the object side surface of the fourth lens L4, it is possible to correct spherical aberration and field curvature satisfactorily.

The shape of the object side surface of the fourth lens L4, similarly to the shape of the image side surface of the second lens L2 described with reference to FIG. 2, can be described as follow. In the sectional view of the lens system, the effective diameter edge of the object side surface of the fourth lens L4 is assumed as the point X8, and the intersection point between the normal line at the point and the optical axis Z is assumed as the point P8. In this case, a length |X8-P8| of the segment connecting the point X8 and the point P8 is defined as an absolute value of a radius of curvature |RX8| at the point X8. Further, the intersection point between the object side surface of the fourth lens L4 and the optical axis Z, that is, the center of the object side surface of the fourth lens L4 is assumed as the point Q8.

In the above description, the object side surface of the fourth lens L4 has "the shape in which the surface has a positive power at the center thereof and the positive power becomes smaller as the periphery thereof gets closer". This means that the surface has a convex shape in the paraxial region including the point Q8. In addition, this means that the surface has the shape in which the point P8 is closer to the image side than the point Q8 and the absolute value of the radius of curvature at each point on the lens surface becomes larger as the point gets closer to the point X8 than the point Q8 along the lens surface.

Alternatively, it is preferable that the object side surface of the fourth lens L4 should have a shape in which the surface at the effective diameter edge has a smaller positive power than that at the center. Here, the meaning that the object side surface of the fourth lens L4 has "a shape in which the surface at the effective diameter edge has a smaller positive power than that at the center" is as follows. The point P8 is closer to the image side than the point Q8, and the surface has the shape in which the absolute value of the radius of curvature |RX8| at the point X8 is larger than the absolute value of the radius of curvature |R8| at the point Q8.

It is preferable that the |RX8| should be larger than 1.1 times |R8|. That is, it is preferable to satisfy 1.1<|RX8|/|R8|. In this case, it becomes easy to correct spherical aberration and field curvature.

It is preferable that the image side surface of the fourth lens L4 should have a shape in which the surface has a positive power at the center and the positive power becomes smaller as the periphery thereof gets closer. By setting the image side surface of the fourth lens L4, it is possible to correct spherical aberration and field curvature satisfactorily.

The shape of the image side surface of the fourth lens L4, similarly to the shape of the image side surface of the second lens L2 described with reference to FIG. 2, can be described as follow. In the sectional view of the lens system, the effective diameter edge of the image side surface of the fourth lens L4 is assumed as the point X9, and the intersection point between the normal line at the point and the optical axis Z is assumed as the point P9. In this case, a length |X9-P9| of the segment connecting the point X9 and the point P9 is defined as an absolute value of a radius of curvature |RX9| at the point X9. Further, the intersection point between the image side surface of the fourth lens L4 and the optical axis Z, that is, the center of the object side surface of the fourth lens L4 is assumed as the point Q9.

In the above description, the image side surface of the fourth lens L4 has "the shape in which the surface has a positive power at the center thereof and the positive power becomes smaller as the periphery thereof gets closer". This means that the surface has a convex shape in the paraxial region including the point Q9. In addition, this means that the surface has the shape in which the point P9 is closer to the object side than the point Q9 and the absolute value of the radius of curvature at each point on the lens surface becomes larger as the point gets closer to the point X9 than the point Q9 along the lens surface.

Alternatively, it is preferable that the image side surface of the fourth lens L4 should have a shape in which the surface at the effective diameter edge has a smaller positive power than that at the center. Here, the meaning that the image side surface of the fourth lens L4 has "a shape in which the surface at the effective diameter edge has a smaller positive power than that at the center" is as follows. The point P9 is closer to the image side than the point Q9, and the surface has the shape in which the absolute value of the radius of curvature |RX9| at the point X9 is larger than the absolute value of the radius of curvature |R9| at the point Q9.

It is preferable that the |RX9| should be larger than 1.4 times |R9|. That is, it is preferable to satisfy 1.4<|RX9|/|R9|. In this case, it becomes easy to correct spherical aberration and field curvature.

Further, assuming that a distance on the optical axis from an object side surface of the first lens L1 to an imaging plane is L and the focal length of the whole system is f, it is preferable to satisfy the following Conditional Expression (7). Furthermore, at the time of calculating the distance L, a back focal length is assumed as an air conversion length. Specifically, when a cover glass, a filter, or the like is disposed between the lens closest to the image side and the imaging plane Sim, air conversion values are used therein.

$$8.0 < L/f < 13.0 \quad (7)$$

When the result value of Conditional Expression (7) is equal to or more than the upper limit thereof, it is possible to achieve an increase in angle of view, but the size of the lens system increases. When the result value of Conditional Expression (7) is equal to or less than the lower limit thereof, it is possible to miniaturize the lens system, but it becomes difficult to achieve an increase in angle of view.

In order to increase further the angle of view and decrease further the size of the system, it is more preferable to satisfy the following Conditional Expression (7-2). By satisfying the upper limit of Conditional Expression (7-2), it is possible to decrease further the size of the lens system. In addition, by satisfying the lower limit of Conditional Expression (7-2), it becomes easier to increase an angle of view.

$$9.0 < L/f < 12.0 \quad (7\text{-}2)$$

It is preferable that the L should be 13 mm or less. By setting the L to 13 mm or less, it is possible to miniaturize the lens system. In order to miniaturize further the lens system, it is preferable to set the L to 12 mm or less.

Assuming that the distance on the optical axis from the image side surface of the lens (the fourth lens L4 in the example shown in FIG. 1) closest to the image side to the imaging plane Sim is Bf and the focal length of the whole system is f, it is preferable to satisfy the following Conditional Expression (8). Furthermore, the Bf corresponds to the back focal length, and at the time of calculating the Bf, the air conversion length is used. Specifically, when a cover glass, a filter, or the like is disposed between the lens closest to the image side and the imaging plane Sim, air conversion values are used therein.

$$1.0 < Bf/f < 2.5 \tag{8}$$

When the result value of Conditional Expression (8) is equal to or more than the upper limit thereof, the size of the lens system increases. When the result value of Conditional Expression (8) is equal to or less than the lower limit, the back focal length decreases. Thus, it becomes difficult to insert various filters or cover glasses between the lens system and the imaging device 5 (the imaging plane Sim).

Furthermore, it is more preferable to satisfy the following Conditional Expression (8-2). When the upper limit of Conditional Expression (8-2) is satisfied, it is possible to miniaturize further the lens system. When the lower limit of Conditional Expression (8-2) is satisfied, it becomes easier to increase the back focal length.

$$1.5 < Bf/f < 2.0 \tag{8-2}$$

Furthermore, it is preferable that the back focal length Bf should be 1.5 mm or more. By setting the Bf to 1.5 mm or more, it becomes easy to insert various filters or cover glasses between the lens system and the imaging device 5 (the imaging plane Sim).

Assuming that a center thickness of the first lens L1 is D1, it is preferable to satisfy the following Conditional Expression (9). By satisfying Conditional Expression (9), it is possible to increase hardness of the first lens L1.

$$0.9 < D1 \tag{9}$$

In order to increase further hardness of the first lens L1, it is preferable to satisfy the following Conditional Expression (9-2).

$$1.5 < D1 \tag{9-2}$$

In order to increase further more hardness of the first lens L1, it is preferable to satisfy the following Conditional Expression (9-3).

$$1.8 < D1 \tag{9-3}$$

Assuming that the focal length of the whole system is f and a center thickness of the first lens L1 is D1, it is preferable to satisfy the following Conditional Expression (10).

$$0.7 < D1/f < 2 \tag{10}$$

By satisfying the upper limit of Conditional Expression (10), it is possible to miniaturize the lens system. In addition, by satisfying the lower limit of Conditional Expression (10), it is possible to make the first lens L1 infrangible.

Assuming that the focal length of the whole system is f and the center thickness of the second lens L2 is D3, it is preferable to satisfy the following Conditional Expression (11).

$$0.9 < D3/f < 2 \tag{11}$$

By satisfying the upper limit of Conditional Expression (11), it is possible to miniaturize the lens system. When the result value of Conditional Expression (11) is equal to or less than the lower limit thereof, the thickness of the lens system decreases. Thus, it becomes difficult to manufacture the lens system, and it causes an increase in cost.

Assuming that the focal length of the whole system is f, the distance on the optical axis from the image side surface of the first lens L1 to the object side surface of the second lens L2 is D2, and the center thickness of the second lens L2 is D3, it is preferable to satisfy the following Conditional Expression (12).

$$1.0 < (D2+D3)/f < 3.5 \tag{12}$$

When the result value of Conditional Expression (12) is equal to or more than the upper limit thereof, the size of the lens system increases. When the result value of Conditional Expression (12) is equal to or less than the lower limit thereof, it becomes difficult to achieve an increase in angle of view.

Assuming that the focal length of the whole system is f and the focal length of the second lens L2 is f2, it is preferable to satisfy the following Conditional Expression (13).

$$-1.5 < f2/f < -0.5 \tag{13}$$

When the result value of Conditional Expression (13) is equal to or more than the upper limit thereof, the power of the second lens L2 excessively increases, and allowances for assembly errors and manufacturing errors with respect to eccentricity decreases. As a result, it becomes difficult to perform assembly, and it causes an increase in cost. When the result value of Conditional Expression (13) is equal to or less than the lower limit thereof, it becomes difficult to achieve an increase in angle of view.

It is preferable that the total angle of view of the imaging lens 1 be 130° or more. By forming the total angle of view so as to be 130° or more, the angle of view is sufficient even when the lens is used for an on-board camera or a surveillance camera.

It is preferable that the Abbe number of the second lens L2 at the d-line be 40 or more. Thereby, it is possible to suppress occurrence of chromatic aberration, and thus it is possible to obtain a fine image.

It is preferable that the Abbe number of the third lens L3 at the d-line be 29 or less. Thereby, it is possible to correct lateral chromatic aberration satisfactorily. Furthermore, when the Abbe number of the third lens L3 at the d-line is set to 26 or less, it is possible to correct lateral chromatic aberration further satisfactorily. In addition, when the Abbe number of the third lens L3 at the d-line is set to 25 or less, it is possible to minimize lateral chromatic aberration.

It is preferable that the Abbe number of the fourth lens L4 at the d-line be 40 or more. Thereby, it is possible to suppress occurrence of chromatic aberration, and thus it is possible to obtain a fine image.

It is preferable that the first lens L1 be made of plastic. Since the first lens L1 is made of plastic, it is possible to form a low-cost and lightweight lens system. In addition, when an aspheric surface is formed on the first lens L1, it is possible to manufacture the aspheric shapes precisely. Hence, it is possible to manufacture a lens having a desirable performance.

Furthermore, the plastic has lower stiffness than the glass, but has a property of infrangibility against shock. Hence, when the first lens L1 is made of plastic, it is possible to make the lens infrangible against various kinds of shock.

When the first lens L1 is made of plastic, it is preferable to apply a treatment for improving antiweatherability of the first lens L1 to the object side surface of the first lens L1. It is preferable to use, for example, a hard coat as the treatment for improving antiweatherability. Further, it is also preferable to apply treatments for improving shock resistance, scratch resistance, and chemical resistance of the lens system by using the hard coat or the like.

A hydrophobic coat may be applied to the object side surface of the first lens L1. By using the hydrophobic coat, it becomes difficult to attach drops of water, dirt, and the like. Alternatively, a hydrophilic coat may be applied onto the object side surface of the first lens L1. By using the hydrophilic coat, even when liquid such as water is splashed, permeation thereof is reduced, and the liquid is unlikely to form liquid drops, and thus it is possible to secure transparency. In addition, even when there is dirt, the dirt naturally drops down and washes out, and thus it is possible to secure a field of vision.

The imaging lens according to the embodiment of the invention is a wide angle lens, and for example, it is assumed that the total angle of view is 130° or more. Hence, the incident angles of the rays are large in the peripheral portion of the object side surface of the first lens L1. Accordingly, it is preferable to apply a coat, which has a small wavelength dependency, onto the object side surface of the first lens L1.

On the image side surface of the first lens L1, the angle, which is formed between the normal line of the surface and the optical axis Z, is small at the center portion but the angle, which is formed between the normal line of the surface and the optical axis Z, is large at the peripheral portion. Hence, the difference of reflectance between the center portion and the peripheral portion increases, and thus there is concern that the difference causes a ghost. Accordingly, it is preferable to apply a coat, which has a small wavelength dependency, onto the image side surface of the first lens L1.

Furthermore, as compared with a multi-layer coat intended to prevent reflection in the predetermined wavelength range, reflectance of a single layer coat relative to a wavelength slowly changes at and near the limit wavelength of the multi-layer coat. From this point, the single coat may be applied onto at least any one surface of the object side surface of the first lens L1 and the image side surface of the first lens surface L1.

As the material of the first lens L1, it is preferable to use, for example, acryl, polyolefine based material, polycarbonate based material, epoxy resin, PET (Polyethylene terephthalate), and PES (Poly Ether Sulphone). By using those, it is possible to manufacture the first lens L1 with low cost.

Furthermore, the polycarbonate is a material relatively harder than the other plastic materials, but it has a small Abbe number, and birefringence thereof is large. Hence, when the polycarbonate is used in a negative lens having a strong power, chromatic aberration and birefringence increase, and thus it becomes difficult to obtain a fine image. However, even when the polycarbonate is used in the first lens L1 by decreasing the power of the first lens L1 as described in the embodiment of the invention, it is possible to suppress effects of chromatic aberration and birefringence. As a result, it is possible to manufacture a lens with an excellent shock resistance while securing a favorable performance.

When the first lens L1 is made of the polycarbonate based material, it is preferable to apply the hard coat to the object side surface of the first lens L1. By applying a hard coat, it is possible to improve further hardness of the first lens L1. Thus, it is possible to manufacture a lens with an excellent scratch resistance, and it is also possible to improve a chemical resistance of the first lens L1.

It is preferable that any one of the second lens L2, the third lens L3, and the fourth lens L4 or a plurality of optional combinations of those should be made of plastic. Since plastic is used as the material, it is possible to form a low-cost and lightweight lens system. In addition, when an aspheric surface is provided, it is possible to manufacture the aspheric shapes precisely. Hence, it is possible to manufacture a lens having a desirable performance.

In the case where at least any one of the first lens L1, the second lens L2, the third lens L3, and the fourth lens L4 is made of plastic, the material thereof may include a so-called nanocomposite material formed by mixing particulates, which have sizes smaller than a wavelength of light, into the plastic.

Furthermore, the first lens L1 may be made of glass. When the imaging lens 1 is used in a severe environment such as an on-board camera, it is required that the first lens L1 disposed closest to the object side have high resistivity with respect to temperature variance caused by direct rays and surface deterioration caused by rainstorm. In addition, it is required that the lens uses a material having high resistivity with respect to chemicals such as oils and cleaners, that is, a material having high water resistance, high antiweatherability, high acid resistance, and high chemical resistance. In addition, it is also required that the lens use a hard and infrangible material. By using glass as the material, it is possible to satisfy these requirements.

Available glass materials of the first lens L1 include, for example, borosilicate based glass (a borosilicate glass), white plate glass, and blue plate glass. By using those, it is possible to manufacture the first lens L1 with low cost.

Any one of the second lens L2, the third lens L3, and the fourth lens L4 or a plurality of optional combinations of those may be made of plastic. By using the material thereof as glass, it is possible to suppress deterioration in performance caused by temperature change.

At least one of the first lens L1, the second lens L2, the third lens L3, and the fourth lens L4 it is preferable that the glass transition temperature (Tg) should be 145° C. or more. In addition, it is more preferable that the glass transition temperature of the material be 150° C. or more. By using the material having the glass transition temperature of 150° C. or more, it is possible to form a lens with higher heat resistance.

Furthermore, depending on the use of the imaging lens 1, a filter for cutting blue light from ultraviolet light or a filter such as an IR (Infra Red) cut filter for cutting infrared light may be interleaved between the lens system and the imaging device 5.

FIG. 1 shows an example in which the optical member PP assumed as various filters or the like is disposed between the lens system and the imaging device 5. Instead, various filters may be disposed between the lenses. Alternatively, a coat having the same effect as the various filters may be applied onto the lens surface of the several lenses included in the imaging lens 1.

In addition, there is a concern that rays passing through out of the effective diameter reach the imaging plane as stray light and become a ghost image, and thus it is preferable to shield the stray light by providing light shielding means. Examples of the shielding means may include an opaque coating material and an opaque plate member provided on a portion outside the effective diameter of a lens. Alternatively, the stray light may be shielded by providing an opaque plate member on the optical path of the stray light, as the light shielding means. Alternatively, a hood and the like for shielding the stray light may be disposed closer to the object side than the lens closest to the object side. In FIG. 1, there is shown an example in which shielding means 11 and 12 are provided out of the effective diameter ranges of the respective image side surfaces of the first lens L1 and the second lens L2. Furthermore, the location, on which the light shielding means is provided, is not limited to the example shown in FIG. 1, and the light shielding means may be disposed on another lens or between lenses.

Furthermore, a member for shielding marginal rays in the range, in which there is no trouble in the relative illumination in practice, may be disposed between the lenses. The marginal rays are defined rays, which are transmitted through the peripheral portion of the entrance pupil of the optical lens system, among rays from the object point except for the optical axis Z. As described above, by arranging the member for shielding the marginal rays, it is possible to improve image quality in the peripheral portion of the imaging area. Further, by allowing the member to shield the light causing the ghost, it is possible to reduce the ghost.

(Numerical Examples of Imaging Lens)

Next, numerical examples of the imaging lens according to the embodiment of the invention will be described. FIGS. 3 to 9 show the lens sectional views of the imaging lens according to Examples 1 to 7. In FIGS. 3 to 9, the left side of the drawing is the object side, and the right side thereof is the image side. Similarly to FIG. 1, the drawings show the aperture diaphragm St, the optical member PP, and the imaging device 5 disposed on the imaging plane Sim. The aperture diaphragm St shown in the drawings does not illustrate a shape and a size thereof, but illustrates a position thereof on the optical axis Z. In each of the examples, the reference numerals Ri and Di (i=1, 2, 3, . . . ) of each lens sectional view correspond to the reference numerals Ri and Di of each lens data to be described below.

Table 1 shows lens data and various data of the imaging lens according to Example 1, Table 2 shows aspheric surface data, and Table 3 shows data on radius of curvature. Likewise, Tables 4 to 21 show lens data, various data, and aspheric surface data of the imaging lenses according to Examples 2 to 7. Hereinafter, the meanings of the reference signs in the tables are described through Example 1, and are basically the same as those of Examples 2 to 7.

In the lens data of Table 1, a surface number Si represents the sequential number of i-th (i=1, 2, 3, . . . ) surface that sequentially increases as it gets closer to the image side when a surface of a component closest to the object side is defined as a first surface. In Table 1, Ri represents a radius of curvature of i-th surface, and Di represents an on-axis surface spacing on the optical axis Z between the i-th surface and the (i+1)th surface. Furthermore, it is assumed that the algebraic sign of the radius of curvature of the surface convex toward the object side is positive, and the algebraic sign of the radius of curvature of the surface convex toward the image side is negative.

Further, in the lens data, Ndj represents a refractive index at the d-line (a wavelength of 587.6 nm) in a j-th (j=1, 2, 3, . . . ) optical element of which the sequential number sequentially increases as it gets closer to the image side when a surface of the optical element closest to the object side is defined as a first surface. In addition, vdj represents an Abbe number of the j-th optical element at the d-line. Furthermore, the lens data also show the aperture diaphragm St and the optical member PP. The item of the radius of curvature of the surface corresponding to the aperture diaphragm St is noted as the aperture diaphragm.

In the various data of Table 1, Fno. represents an F number, 2ω represents a total angle of view, IH represents the maximum image height on the imaging plane Sim, Bf represents a distance (corresponds to a back focal length, an air conversion length) on the optical axis Z from the image side surface of the lens closest to the image side to the imaging plane, and L represents a distance (the back focal length part is air-converted) on the optical axis Z from the object side surface of the first lens L1 to the imaging plane Sim. In addition, f represents a focal length of the whole system, f1 represents a focal length of the first lens L1, f2 represents a focal length of the second lens L2, f3 represents a focal length of the third lens L3, f4 represents a focal length of the fourth lens L4, f12 represents a composite focal length of the first lens L1 and the second lens L2, and f34 represents a composite focal length of the third and fourth lenses L3 and L4.

In the lens data of Table 1, the reference numeral * is added to the surface numbers of the aspheric surfaces, and numerical values of the radius of curvature (the radius of curvature at the center) near the optical axis are shown as the radius of curvatures of the aspheric surfaces. The aspheric surface data of Table 2 shows the surface numbers of the aspheric surfaces and the aspheric coefficients of the respective aspheric surfaces. In the Table 2, "E−0n" (n=integer) in the numerical values of the aspheric surface data means "×10$^{-n}$", and "E+00" in the numerical values of the aspheric surface data means "×10$^{0}$". Furthermore, the aspheric coefficients are values of the respective coefficients KA and RBm (m=3, 4, 5, . . . 15) in the following Aspheric Expression (A).

$$Zd = C \cdot h^2 / \{1 + (1 - KA \cdot C^2 \cdot h^2)^{1/2}\} + \Sigma RBm \cdot h^m \quad (A)$$

where

Zd is a depth of an aspheric surface (a length of a perpendicular line dropped from a point, which exists on an aspheric surface at a height h from the optical axis, to a plane, which is perpendicular to the optical axis, tangent to the vertex of the aspheric surface), H is a height (a distance from the optical axis to the lens surface), C is an inverse value of a paraxial radius of curvature, and KA and RBm are aspheric coefficients (m=3, 4, 5, . . . 15).

The data of the radius of curvature of Table 3 shows surface numbers, absolute values of radius of curvatures at an effective diameter edge, and ratios of the absolute values of radius of curvatures at the effective diameter edge to absolute values of radius of curvatures at the center, with reference to the above mentioned reference signs. For example, the |RX4| represents an absolute value of the radius of curvature at the effective diameter edge of the image side surface (the fourth surface) of the second lens L2. In addition, the |RX4|/|R4| represents the ratio of the absolute value of radius of curvature at the effective diameter edge of the image side surface (the fourth surface) of the second lens L2 to the absolute value of the radius of curvature at the center thereof. Likewise, the |RX5| represents an absolute value of the radius of curvature at the effective diameter edge of the object side surface of the third lens L3. In addition, the |RX5|/|R5| represents the ratio of the absolute value of radius of curvature at the effective diameter edge of the object side surface of the third lens L3 to the absolute value of the radius of curvature at the center thereof. The |RX6| represents an absolute value of the radius of curvature at the effective diameter edge of the image side surface of the third lens L3. In addition, the |RX6|/|R6| represents the ratio of the absolute value of radius of curvature at the effective diameter edge of the image side surface of the third lens L3 to the absolute value of the radius of curvature at the center thereof. The |RX8| represents an absolute value of the radius of curvature at the effective diameter edge of the object side surface of the fourth lens L4. In addition, the |RX8|/|R8| represents the ratio of the absolute value of radius of curvature at the effective diameter edge of the object side surface of the fourth lens L4 to the absolute value of the radius of curvature at the center thereof. The |RX9| represents an absolute value of the radius of curvature at the effective diameter edge of the image side surface of the fourth lens L4. In addition, the |RX9|/|R9| represents the ratio of the absolute value of radius of curvature at the effective diameter edge of the image side surface of the fourth lens L4 to the absolute value of the radius of curvature at the center thereof. Furthermore, Tables 1 to 3 show numerical values which are rounded off to a predetermined decimal place. Regarding units of the numerical values, "degree" is used for 2ω of Table 1, and "mm" is used for the length. However, those are just examples, and other appropriate units may be used since the optical system has the same optical performance even when scaled up or scaled down.

TABLE 1

EXAMPLE 1 LENS DATA

| Si | Ri | Di | Ndj | vdj |
|---|---|---|---|---|
| 1 | 12.20 | 1.00 | 1.49 | 57.6 |
| 2 | 10.00 | 1.61 | | |
| 3 | 200.00 | 1.20 | 1.53 | 55.2 |
| 4* | 0.77 | 1.62 | | |
| 5* | 1.65 | 2.12 | 1.61 | 25.5 |
| 6* | 6.78 | 0.15 | | |
| 7 | (APERTURE DIAPHRAGM) | 0.22 | | |
| 8* | 3.91 | 2.00 | 1.53 | 55.2 |
| 9* | −1.20 | 1.00 | | |
| 10 | ∞ | 0.50 | 1.52 | 64.2 |
| ∞ IMAGING PLANE | ∞ | 0.48 — | | |

EXAMPLE 1 VARIOUS DATA

| | |
|---|---|
| Fno. | 2.8 |
| 2ω | 153.8 |
| IH | 2.25 |
| Bf | 1.81 |
| L | 11.73 |
| f | 1.03 |
| f1 | −132.89 |
| f2 | −1.45 |
| f3 | 3.06 |
| f4 | 2.00 |
| f12 | −1.45 |
| f34 | 3.00 |

TABLE 2

EXAMPLE 1 ASPHERIC DATA

| Si | KA | RB3 | RB4 | RB5 | RB6 |
|---|---|---|---|---|---|
| 4 | 3.69E−02 | −3.04E−02 | −2.19E−02 | 1.26E−02 | 7.54E−03 |
| 5 | 0.00E+00 | −4.30E−02 | 4.93E−02 | −5.93E−03 | 8.09E−03 |
| 6 | 0.00E+00 | −9.33E−02 | 2.09E−01 | 1.40E−01 | −2.01E−01 |
| 8 | 0.00E+00 | −6.09E−02 | 1.00E−02 | 2.48E−02 | 3.60E−02 |
| 9 | 0.00E+00 | −4.67E−02 | 8.98E−02 | −2.23E−02 | −2.35E−02 |

| Si | RB7 | RB8 | RB9 | RB10 |
|---|---|---|---|---|
| 4 | 4.17E−03 | 4.23E−04 | −7.52E−04 | −9.25E−04 |
| 5 | −3.27E−03 | −1.80E−03 | −3.95E−04 | 4.62E−04 |
| 6 | −5.21E−01 | −5.76E−01 | 2.33E−01 | 2.68E+00 |
| 8 | 1.67E−02 | −1.61E−02 | −3.91E−02 | −1.39E−02 |
| 9 | 1.01E−02 | 6.70E−03 | 1.66E−03 | −1.74E−03 |

TABLE 3

EXAMPLE 1 DATA ON RADIUS OF CURVATURE

| Si | EFFECTIVE DIAMETER EDGE | | RATIO OF EFFECTIVE DIAMETER EDGE TO CENTER | |
|---|---|---|---|---|
| 4 | |RX4| | 1.85 | |RX4|/|R4| | 2.40 |
| 5 | |RX5| | 2.03 | |RX5|/|R5| | 1.23 |
| 6 | |RX6| | 5.34 | |RX6|/|R6| | 0.79 |
| 8 | |RX8| | 4.83 | |RX8|/|R8| | 1.23 |
| 9 | |RX9| | 2.25 | |RX9|/|R9| | 1.87 |

TABLE 4

EXAMPLE 2 LENS DATA

| Si | Ri | Di | Ndj | vdj |
|---|---|---|---|---|
| 1 | 30.00 | 1.00 | 1.49 | 57.6 |
| 2 | 30.00 | 0.55 | | |
| 3 | 200.00 | 1.20 | 1.53 | 55.2 |
| 4* | 0.77 | 1.71 | | |
| 5* | 1.65 | 2.12 | 1.61 | 25.5 |
| 6* | 6.09 | 0.15 | | |
| 7 | (APERTURE DIAPHRAGM) | 0.22 | | |
| 8* | 3.93 | 2.00 | 1.53 | 55.2 |
| 9* | −1.19 | 1.00 | | |
| 10 | ∞ | 0.50 | 1.52 | 64.2 |
| 11 IMAGING PLANE | ∞ | 0.46 — | | |

EXAMPLE 2 VARIOUS DATA

| | |
|---|---|
| Fno. | 2.8 |
| 2ω | 153.6 |
| IH | 2.25 |
| Bf | 1.79 |
| L | 10.74 |
| f | 1.01 |
| f1 | 5547.29 |
| f2 | −1.44 |
| f3 | 3.12 |
| f4 | 1.98 |
| f12 | −1.46 |
| f34 | 3.01 |

TABLE 5

EXAMPLE 2 ASPHERIC DATA

| Si | KA | RB3 | RB4 | RB5 | RB6 |
|---|---|---|---|---|---|
| 4 | 3.65E−02 | −2.80E−02 | −2.22E−02 | 1.24E−02 | 7.56E−03 |
| 5 | 0.00E+00 | −4.49E−02 | 4.98E−02 | −5.75E−03 | 8.19E−03 |
| 6 | 0.00E+00 | −9.74E−02 | 2.15E−01 | 1.54E−01 | −1.93E−01 |
| 8 | 0.00E+00 | −6.20E−02 | 7.34E−03 | 2.06E−02 | 3.60E−02 |
| 9 | 0.00E+00 | −5.09E−02 | 8.83E−02 | −2.30E−02 | −2.38E−02 |

| Si | RB7 | RB8 | RB9 | RB10 |
|---|---|---|---|---|
| 4 | 4.18E−03 | 4.37E−04 | −7.42E−04 | −9.20E−04 |
| 5 | −3.24E−03 | −1.80E−03 | −4.04E−04 | 4.51E−04 |
| 6 | −5.55E−01 | −6.77E−01 | 2.12E−01 | 3.09E+00 |
| 8 | 1.82E−02 | −1.33E−02 | −3.47E−02 | −7.25E−03 |
| 9 | 1.00E−02 | 6.75E−03 | 1.72E−03 | −1.71E−03 |

TABLE 6

EXAMPLE 2 DATA ON RADIUS OF CURVATURE

| Si | EFFECTIVE DIAMETER EDGE | | RATIO OF EFFECTIVE DIAMETER EDGE TO CENTER | |
|---|---|---|---|---|
| 4 | |RX4| | 1.89 | |RX4|/|R4| | 2.47 |
| 5 | |RX5| | 2.04 | |RX5|/|R5| | 1.24 |
| 6 | |RX6| | 4.69 | |RX6|/|R6| | 0.77 |
| 8 | |RX8| | 4.93 | |RX8|/|R8| | 1.25 |
| 9 | |RX9| | 2.15 | |RX9|/|R9| | 1.82 |

TABLE 7

EXAMPLE 3 LENS DATA

| Si | Ri | Di | Ndj | vdj |
|---|---|---|---|---|
| 1 | 44.54 | 2.00 | 1.49 | 57.6 |
| 2 | 25.00 | 0.76 | | |
| 3 | 200.00 | 1.20 | 1.53 | 55.2 |
| 4* | 0.78 | 1.61 | | |
| 5* | 1.69 | 2.12 | 1.61 | 25.5 |
| 6* | 7.58 | 0.16 | | |
| 7 | (APERTURE DIAPHRAGM) | 0.23 | | |
| 8* | 4.29 | 2.00 | 1.53 | 55.2 |
| 9* | −1.22 | 1.00 | | |
| 10 | ∞ | 0.50 | 1.52 | 64.2 |
| 11 | ∞ | 0.52 | | |
| IMAGING PLANE | — | | | |

EXAMPLE 3 VARIOUS DATA

| | |
|---|---|
| Fno. | 2.8 |
| 2ω | 156.6 |
| IH | 2.25 |
| Bf | 1.85 |
| L | 11.93 |
| f | 1.05 |
| f1 | −120.10 |
| f2 | −1.46 |
| f3 | 3.00 |
| f4 | 2.04 |
| f12 | −1.45 |
| f34 | 3.02 |

TABLE 8

EXAMPLE 3 ASPHERIC DATA

| Si | KA | RB3 | RB4 | RB5 | RB6 |
|---|---|---|---|---|---|
| 4 | 1.77E−02 | −2.97E−02 | −2.53E−02 | 1.11E−02 | 6.84E−03 |
| 5 | 0.00E+00 | −4.77E−02 | 4.85E−02 | −6.70E−03 | 7.86E−03 |
| 6 | 0.00E+00 | −1.02E−01 | 1.76E−01 | 1.49E−01 | −1.33E−01 |
| 8 | 0.00E+00 | −6.83E−02 | 1.65E−02 | 2.62E−02 | 2.56E−02 |
| 9 | 0.00E+00 | −4.37E−02 | 9.31E−02 | −2.60E−02 | −2.54E−02 |

| Si | RB7 | RB8 | RB9 | RB10 |
|---|---|---|---|---|
| 4 | 4.21E−03 | 6.15E−04 | −5.61E−04 | −8.12E−04 |
| 5 | −3.17E−03 | −1.61E−03 | −3.01E−04 | 4.18E−04 |
| 6 | −4.02E−01 | −5.34E−01 | −9.01E−02 | 2.22E+00 |
| 8 | −2.68E−03 | −3.16E−02 | −2.96E−02 | 4.65E−02 |
| 9 | 9.73E−03 | 6.93E−03 | 1.75E−03 | −2.08E−03 |

TABLE 9

EXAMPLE 3 DATA ON RADIUS OF CURVATURE

| Si | EFFECTIVE DIAMETER EDGE | | RATIO OF EFFECTIVE DIAMETER EDGE TO CENTER |
|---|---|---|---|
| 4 | \|RX4\| | 1.86 | \|RX4\|/\|R4\| | 2.39 |
| 5 | \|RX5\| | 2.08 | \|RX5\|/\|R5\| | 1.23 |
| 6 | \|RX6\| | 6.72 | \|RX6\|/\|R6\| | 0.89 |
| 8 | \|RX8\| | 5.70 | \|RX8\|/\|R8\| | 1.33 |
| 9 | \|RX9\| | 2.14 | \|RX9\|/\|R9\| | 1.75 |

TABLE 10

EXAMPLE 4 LENS DATA

| Si | Ri | Di | Ndj | vdj |
|---|---|---|---|---|
| 1 | 44.54 | 2.00 | 1.58 | 30.2 |
| 2 | 25.00 | 0.76 | | |
| 3 | 200.00 | 1.20 | 1.53 | 55.2 |
| 4* | 0.78 | 1.61 | | |
| 5* | 1.69 | 2.12 | 1.63 | 23.6 |
| 6* | 7.58 | 0.16 | | |
| 7 | (APERTURE DIAPHRAGM) | 0.23 | | |
| 8* | 4.29 | 2.00 | 1.53 | 55.2 |
| 9* | −1.22 | 1.00 | | |
| 10 | ∞ | 0.50 | 1.52 | 64.2 |
| 11 | ∞ | 0.52 | | |
| IMAGING PLANE | — | | | |

EXAMPLE 4 VARIOUS DATA

| | |
|---|---|
| Fno. | 2.8 |
| 2ω | 159.0 |
| IH | 2.25 |
| Bf | 1.85 |
| L | 11.93 |
| f | 1.05 |
| f1 | −101.46 |
| f2 | −1.46 |
| f3 | 3.00 |
| f4 | 2.04 |
| f12 | −1.45 |
| f34 | 3.02 |

TABLE 11

EXAMPLE 4 ASPHERIC DATA

| Si | KA | RB3 | RB4 | RB5 | RB6 |
|---|---|---|---|---|---|
| 4 | 1.77E−02 | −2.97E−02 | −2.53E−02 | 1.11E−02 | 6.84E−03 |
| 5 | 0.00E+00 | −4.77E−02 | 4.85E−02 | −6.70E−03 | 7.86E−03 |
| 6 | 0.00E+00 | −1.02E−01 | 1.76E−01 | 1.49E−01 | −1.33E−01 |
| 8 | 0.00E+00 | −6.83E−02 | 1.65E−02 | 2.62E−02 | 2.56E−02 |
| 9 | 0.00E+00 | −4.37E−02 | 9.31E−02 | −2.60E−02 | −2.54E−02 |

| Si | RB7 | RB8 | RB9 | RB10 |
|---|---|---|---|---|
| 4 | 4.21E−03 | 6.15E−04 | −5.61E−04 | −8.12E−04 |
| 5 | −3.17E−03 | −1.61E−03 | −3.01E−04 | 4.18E−04 |
| 6 | −4.02E−01 | −5.34E−01 | −9.01E−02 | 2.22E+00 |
| 8 | −2.68E−03 | −3.16E−02 | −2.96E−02 | 4.65E−02 |
| 9 | 9.73E−03 | 6.93E−03 | 1.75E−03 | −2.08E−03 |

TABLE 12

EXAMPLE 4 DATA ON RADIUS OF CURVATURE

| Si | EFFECTIVE DIAMETER EDGE | | RATIO OF EFFECTIVE DIAMETER EDGE TO CENTER |
|---|---|---|---|
| 4 | \|RX4\| | 1.86 | \|RX4\|/\|R4\| | 2.39 |
| 5 | \|RX5\| | 2.08 | \|RX5\|/\|R5\| | 1.23 |
| 6 | \|RX6\| | 6.71 | \|RX6\|/\|R6\| | 0.89 |
| 8 | \|RX8\| | 5.70 | \|RX8\|/\|R8\| | 1.33 |
| 9 | \|RX9\| | 2.14 | \|RX9\|/\|R9\| | 1.75 |

TABLE 13

EXAMPLE 5 LENS DATA

| Si | Ri | Di | Ndj | vdj |
|---|---|---|---|---|
| 1 | ∞ | 1.20 | 1.58 | 30.2 |
| 2 | 500.00 | 0.15 | | |
| 3 | 200.00 | 1.20 | 1.53 | 55.2 |
| 4* | 0.77 | 1.62 | | |
| 5* | 1.65 | 2.12 | 1.61 | 25.5 |
| 6* | 6.78 | 0.15 | | |
| 7 | (APERTURE DIAPHRAGM) | 0.22 | | |
| 8* | 3.91 | 2.00 | 1.53 | 55.2 |
| 9* | −1.20 | 1.00 | | |
| 10 | ∞ | 0.50 | 1.52 | 64.2 |
| 11 | ∞ | 0.48 | | |
| IMAGING PLANE | — | | | |

EXAMPLE 5 VARIOUS DATA

| | |
|---|---|
| Fno. | 2.8 |
| 2ω | 159.6 |
| IH | 2.25 |
| Bf | 1.81 |
| L | 10.46 |
| f | 1.03 |
| f1 | −856.69 |
| f2 | −1.45 |
| f3 | 3.06 |
| f4 | 2.00 |
| f12 | −1.45 |
| f34 | 3.00 |

TABLE 14

EXAMPLE 5 ASPHERIC DATA

| Si | KA | RB3 | RB4 | RB5 | RB6 |
|---|---|---|---|---|---|
| 4 | 3.69E−02 | −3.04E−02 | −2.19E−02 | 1.26E−02 | 7.54E−03 |
| 5 | 0.00E+00 | −4.30E−02 | 4.93E−02 | −5.93E−03 | 8.09E−03 |
| 6 | 0.00E+00 | −9.33E−02 | 2.09E−01 | 1.40E−01 | −2.01E−01 |
| 8 | 0.00E+00 | −6.09E−02 | 1.00E−02 | 2.48E−02 | 3.60E−02 |
| 9 | 0.00E+00 | −4.67E−02 | 8.98E−02 | −2.23E−02 | −2.35E−02 |

| Si | RB7 | RB8 | RB9 | RB10 |
|---|---|---|---|---|
| 4 | 4.17E−03 | 4.23E−04 | −7.52E−04 | −9.25E−04 |
| 5 | −3.27E−03 | −1.80E−03 | −3.95E−04 | 4.62E−04 |
| 6 | −5.21E−01 | −5.76E−01 | 2.33E−01 | 2.68E+00 |
| 8 | 1.67E−02 | −1.61E−02 | −3.91E−02 | −1.39E−02 |
| 9 | 1.01E−02 | 6.70E−03 | 1.66E−03 | −1.74E−03 |

TABLE 15

EXAMPLE 5 DATA ON RADIUS OF CURVATURE

| Si | EFFECTIVE DIAMETER EDGE | | RATIO OF EFFECTIVE DIAMETER EDGE TO CENTER |
|---|---|---|---|
| 4 | |RX4| | 1.85 | |RX4|/|R4| | 2.40 |
| 5 | |RX5| | 2.03 | |RX5|/|R5| | 1.23 |
| 6 | |RX6| | 5.35 | |RX6|/|R6| | 0.79 |
| 8 | |RX8| | 4.83 | |RX8|/|R8| | 1.23 |
| 9 | |RX9| | 2.26 | |RX9|/|R9| | 1.88 |

TABLE 16

EXAMPLE 6 LENS DATA

| Si | Ri | Di | Ndj | vdj |
|---|---|---|---|---|
| 1 | 50.00 | 2.00 | 1.58 | 30.2 |
| 2 | 20.00 | 0.76 | | |
| 3 | 200.00 | 1.20 | 1.53 | 55.2 |
| 4* | 0.78 | 1.61 | | |
| 5* | 1.69 | 2.12 | 1.63 | 23.6 |
| 6* | 7.58 | 0.16 | | |
| 7 | (APERTURE DIAPHRAGM) | 0.23 | | |
| 8* | 4.29 | 2.00 | 1.53 | 55.2 |
| 9* | −1.22 | 1.00 | | |
| 10 | ∞ | 0.50 | 1.52 | 64.2 |
| 11 | ∞ | 0.53 | | |
| IMAGING PLANE | — | | | |

EXAMPLE 6 VARIOUS DATA

| | |
|---|---|
| Fno. | 2.8 |
| 2ω | 183.4 |
| IH | 2.25 |
| Bf | 1.81 |
| L | 10.46 |
| f | 1.03 |
| f1 | −58.55 |
| f2 | −1.46 |
| f3 | 3.00 |
| f4 | 2.04 |
| f12 | −1.41 |
| f34 | 3.02 |

TABLE 17

EXAMPLE 6 ASPHERIC DATA

| Si | KA | RB3 | RB4 | RB5 | RB6 |
|---|---|---|---|---|---|
| 4 | 1.77E−02 | −2.97E−02 | −2.53E−02 | 1.11E−02 | 6.84E−03 |
| 5 | 0.00E+00 | −4.77E−02 | 4.85E−02 | −6.70E−03 | 7.86E−03 |
| 6 | 0.00E+00 | −1.02E−01 | 1.76E−01 | 1.49E−01 | −1.33E−01 |
| 8 | 0.00E+00 | −6.83E−02 | 1.65E−02 | 2.62E−02 | 2.56E−02 |
| 9 | 0.00E+00 | −4.37E−02 | 9.31E−02 | −2.60E−02 | −2.54E−02 |

| Si | RB7 | RB8 | RB9 | RB10 |
|---|---|---|---|---|
| 4 | 4.21E−03 | 6.15E−04 | −5.61E−04 | −8.12E−04 |
| 5 | −3.17E−03 | −1.61E−03 | −3.01E−04 | 4.18E−04 |
| 6 | −4.02E−01 | −5.34E−01 | −9.01E−02 | 2.22E+00 |
| 8 | −2.68E−03 | −3.16E−02 | −2.96E−02 | 4.65E−02 |
| 9 | 9.73E−03 | 6.93E−03 | 1.75E−03 | −2.08E−03 |

TABLE 18

EXAMPLE 6 DATA ON RADIUS OF CURVATURE

| Si | EFFECTIVE DIAMETER EDGE | | RATIO OF EFFECTIVE DIAMETER EDGE TO CENTER |
|---|---|---|---|
| 4 | |RX4| | 1.85 | |RX4|/|R4| | 2.39 |
| 5 | |RX5| | 2.08 | |RX5|/|R5| | 1.23 |
| 6 | |RX6| | 6.74 | |RX6|/|R6| | 0.89 |
| 8 | |RX8| | 5.70 | |RX8|/|R8| | 1.33 |
| 9 | |RX9| | 2.14 | |RX9|/|R9| | 1.75 |

TABLE 19

EXAMPLE 7 LENS DATA

| Si | Ri | Di | Ndj | vdj |
|---|---|---|---|---|
| 1 | 24.00 | 1.00 | 1.58 | 30.2 |
| 2 | 20.00 | 0.84 | | |
| 3 | 350.00 | 1.20 | 1.53 | 55.2 |
| 4* | 0.79 | 1.62 | | |
| 5* | 1.73 | 2.14 | 1.63 | 23.6 |
| 6* | 8.46 | 0.15 | | |
| 7 | (APERTURE DIAPHRAGM) | 0.21 | | |
| 8* | 4.96 | 2.00 | 1.53 | 55.2 |
| 9* | −1.17 | 1.00 | | |
| 10 | ∞ | 0.50 | 1.52 | 64.2 |
| 11 | ∞ | 0.52 | | |
| IMAGING PLANE | — | 0.00 | | |

EXAMPLE 7 VARIOUS DATA

| | |
|---|---|
| Fno. | 2.8 |
| 2ω | 157.4 |
| IH | 2.25 |
| Bf | 1.85 |
| L | 11.01 |
| f | 1.03 |
| f1 | −226.47 |
| f2 | −1.48 |
| f3 | 3.06 |
| f4 | 2.01 |
| f12 | −1.48 |
| f34 | 3.00 |

TABLE 20

EXAMPLE 7 ASPHERIC DATA

| Si | KA | RB3 | RB4 | RB5 | RB6 | RB7 | RB8 |
|---|---|---|---|---|---|---|---|
| 4 | 4.46E−02 | −6.36E−02 | −2.28E−02 | 1.25E−02 | 9.36E−03 | 5.65E−03 | 1.03E−03 |
| 5 | 0.00E+00 | −7.56E−02 | 6.11E−02 | −2.76E−03 | 6.53E−03 | −3.40E−03 | −1.99E−03 |
| 6 | 0.00E+00 | −1.42E−01 | 1.44E−01 | 2.99E−01 | −1.43E−02 | −5.96E−01 | −1.06E+00 |
| 8 | 0.00E+00 | −9.90E−02 | 4.91E−02 | 5.75E−02 | 2.73E−02 | −2.98E−02 | −7.32E−02 |
| 9 | 0.00E+00 | −4.26E−02 | 8.73E−02 | −3.16E−02 | −2.69E−02 | 1.16E−02 | 9.24E−03 |

| Si | RB9 | RB10 | RB11 | RB12 | RB13 | RB14 | RB15 |
|---|---|---|---|---|---|---|---|
| 4 | −8.00E−04 | −1.27E−03 | −1.67E−07 | 6.79E−07 | 6.88E−07 | 4.93E−07 | 3.06E−07 |
| 5 | −4.98E−04 | 3.65E−04 | −2.25E−06 | −8.06E−07 | −1.41E−07 | 9.33E−08 | 1.34E−07 |
| 6 | −1.91E−01 | 3.33E+00 | 1.51E−01 | 4.34E−01 | −3.01E−01 | −2.25E−01 | −2.96E+00 |
| 8 | −5.50E−02 | 8.52E−02 | −8.33E−03 | 1.53E−02 | 2.69E−03 | 3.88E−02 | 1.91E−02 |
| 9 | 2.74E−03 | −2.77E−03 | 4.92E−05 | 2.80E−05 | 9.12E−06 | −4.19E−06 | −1.16E−05 |

TABLE 21

EXAMPLE 7 DATA ON RADIUS OF CURVATURE

| Si | EFFECTIVE DIAMETER EDGE | | RATIO OF EFFECTIVE DIAMETER EDGE TO CENTER | |
|---|---|---|---|---|
| 4 | |RX4| | 1.92 | |RX4|/|R4| | 2.44 |
| 5 | |RX5| | 2.26 | |RX5|/|R5| | 1.31 |
| 6 | |RX6| | 9.28 | |RX6|/|R6| | 1.10 |
| 8 | |RX8| | 7.22 | |RX8|/|R8| | 1.46 |
| 9 | |RX9| | 2.06 | |RX9|/|R9| | 1.75 |

The imaging lens according to Examples 1, 3, 4, 6, and 7 includes the first lens L1 having a negative meniscus shape, the second lens L2 having a negative meniscus shape near the optical axis, the third lens L3 having a positive meniscus shape near the optical axis, and the fourth lens L4 having a biconvex shape near the optical axis.

The imaging lens according to Example 2 includes the first lens L1 having a meniscus shape (a positive meniscus shape) of which both surfaces have the same radius of curvature, the second lens L2 having a negative meniscus shape near the optical axis, the third lens L3 having a positive meniscus shape near the optical axis, and the fourth lens L4 having a biconvex shape near the optical axis.

The imaging lens according to Example 5 includes the first lens L1 having a flat-concave shape, the second lens L2 having a negative meniscus shape near the optical axis, the third lens L3 having a positive meniscus shape near the optical axis, and the fourth lens L4 having a biconvex shape near the optical axis.

Further, in the imaging lens according to Examples 1 to 7, all the first lens L1, the second lens L2, the third lens L3, and the fourth lens L4 are made of plastic, and can be manufactured with low cost.

Table 22 shows values corresponding to Conditional Expressions (1) to (13) in the imaging lenses according to Examples 1 to 7. In Examples 1 to 7, the d-line is set as a reference wavelength, and the values at the reference wavelength are shown in Table 22. As can be seen from Table 22, Examples 1 to 7 satisfies all Conditional Expressions (1) to (13).

TABLE 22

CONDITIONAL EXPRESSION

| EXAMPLE | (1) |f1/f| | (2) N1 | (3) v1 | (4) |f12/f34| | (5) |f1/f2| | (6) |RX4|/|R4| |
|---|---|---|---|---|---|---|
| 1 | 129.00 | 1.49 | 57.60 | 0.48 | 91.40 | 2.40 |
| 2 | 5508.92 | 1.49 | 57.60 | 0.48 | 3844.08 | 2.47 |
| 3 | 114.20 | 1.49 | 57.60 | 0.48 | 82.02 | 2.39 |
| 4 | 96.67 | 1.58 | 30.20 | 0.48 | 69.29 | 2.39 |
| 5 | 834.99 | 1.58 | 30.20 | 0.48 | 589.27 | 2.40 |
| 6 | 56.89 | 1.58 | 30.20 | 0.47 | 39.99 | 2.39 |
| 7 | 219.50 | 1.58 | 30.20 | 0.49 | 153.43 | 2.44 |

TABLE 22-continued

| | CONDITIONAL EXPRESSION | | | | | | |
|---|---|---|---|---|---|---|---|
| EXAMPLE | (7) L/f | (8) Bf/f | (9) D1 | (10) D1/f | (11) D3/f | (12) (D2 + D3)/f | (13) f2/f |
| 1 | 11.39 | 1.76 | 1.00 | 0.97 | 1.16 | 2.73 | −1.41 |
| 2 | 10.66 | 1.78 | 1.00 | 0.99 | 1.19 | 1.74 | −1.43 |
| 3 | 11.34 | 1.76 | 2.00 | 1.90 | 1.14 | 1.86 | −1.39 |
| 4 | 11.37 | 1.76 | 2.00 | 1.91 | 1.14 | 1.87 | −1.40 |
| 5 | 10.19 | 1.76 | 1.20 | 1.17 | 1.17 | 1.32 | −1.42 |
| 6 | 10.16 | 1.75 | 2.00 | 1.94 | 1.17 | 1.90 | −1.42 |
| 7 | 10.67 | 1.79 | 1.00 | 0.97 | 1.16 | 1.98 | −1.43 |

FIG. 10 ((A), (B), (C), (D), and (E)) shows aberration diagrams of spherical aberration, astigmatism, distortion (distortion aberration), lateral chromatic aberration (magnification chromatic aberration), and comatic aberration (lateral aberration) of the imaging lens according to Example 1. Each of the aberration diagrams shows aberration in which the d-line (587.56 nm) is set as a reference wavelength. The spherical aberration diagrams and the lateral chromatic aberration diagrams show aberrations at the F-line (a wavelength of 486.13 nm) and the C-line (a wavelength of 656.27 nm).

The Fno. in the spherical aberration diagram represents an F number, the ω in other diagrams represents a half angle of view. In addition, each aberration diagram of distortion shows a deviation amount from an ideal image height expressed by f×tan ϕ, where f is the focal length of the whole system and ϕ (assumed as a variable, $0 \leq \phi \leq \omega$) is the half angle of view. FIG. 10(E) shows comatic aberration diagrams by collecting five aberration diagrams in the tangential and sagittal directions at the half angles of view.

Figure 11:
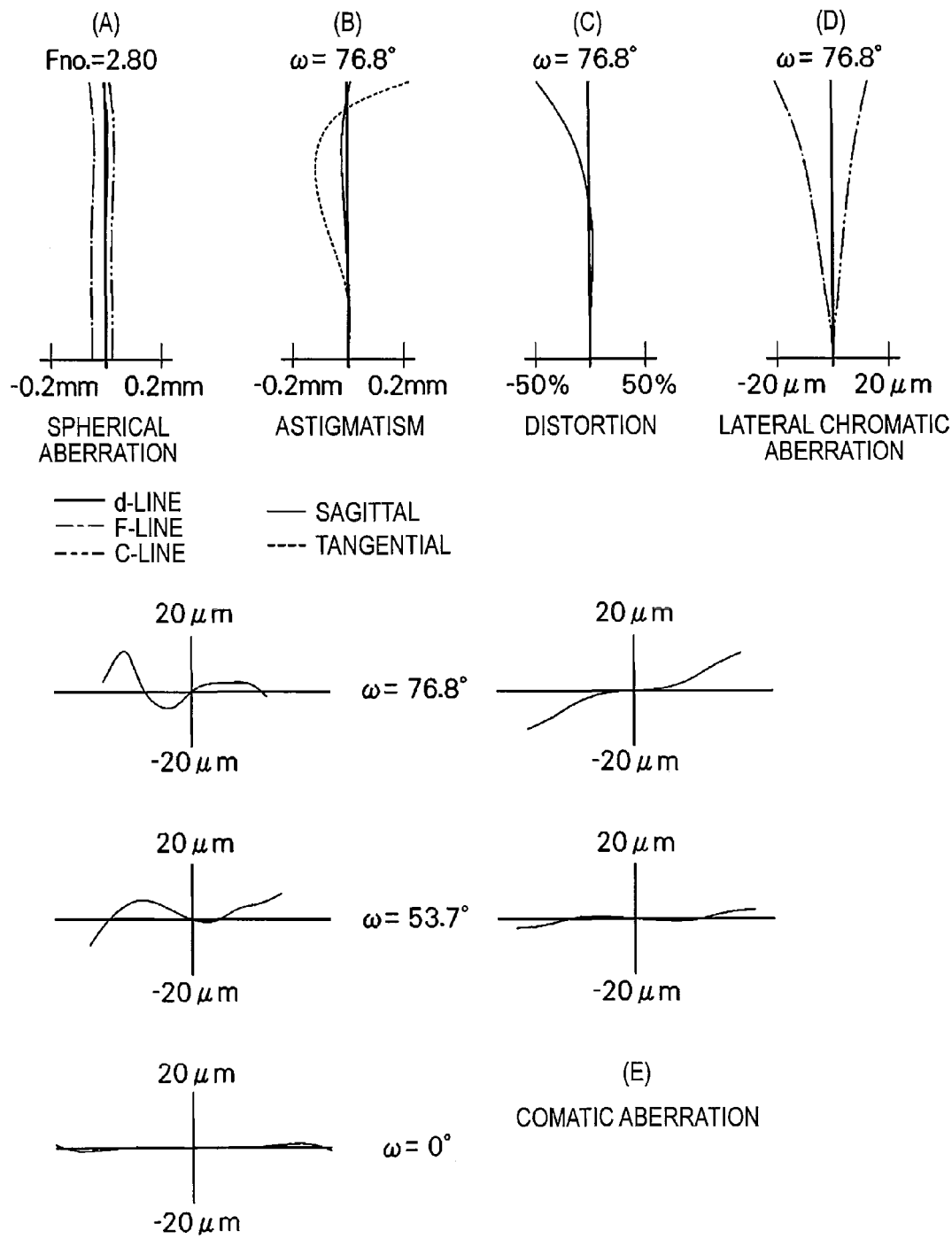
FIG. 11 is diagrams illustrating various diagrams of the imaging lens according to Example 2 of the invention.
Figure 12:
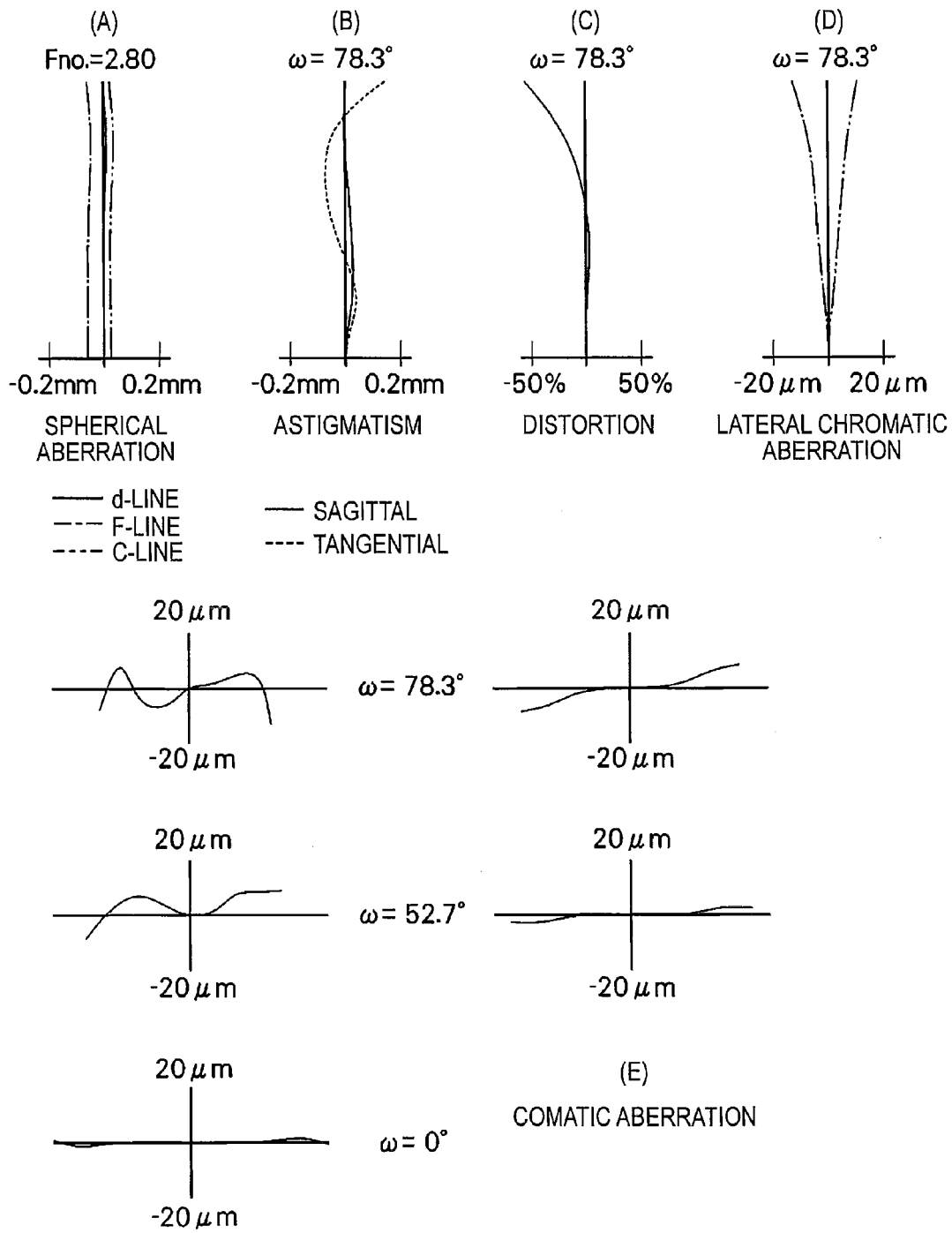
FIG. 12 is diagrams illustrating various diagrams of the imaging lens according to Example 3 of the invention.
Figure 14:
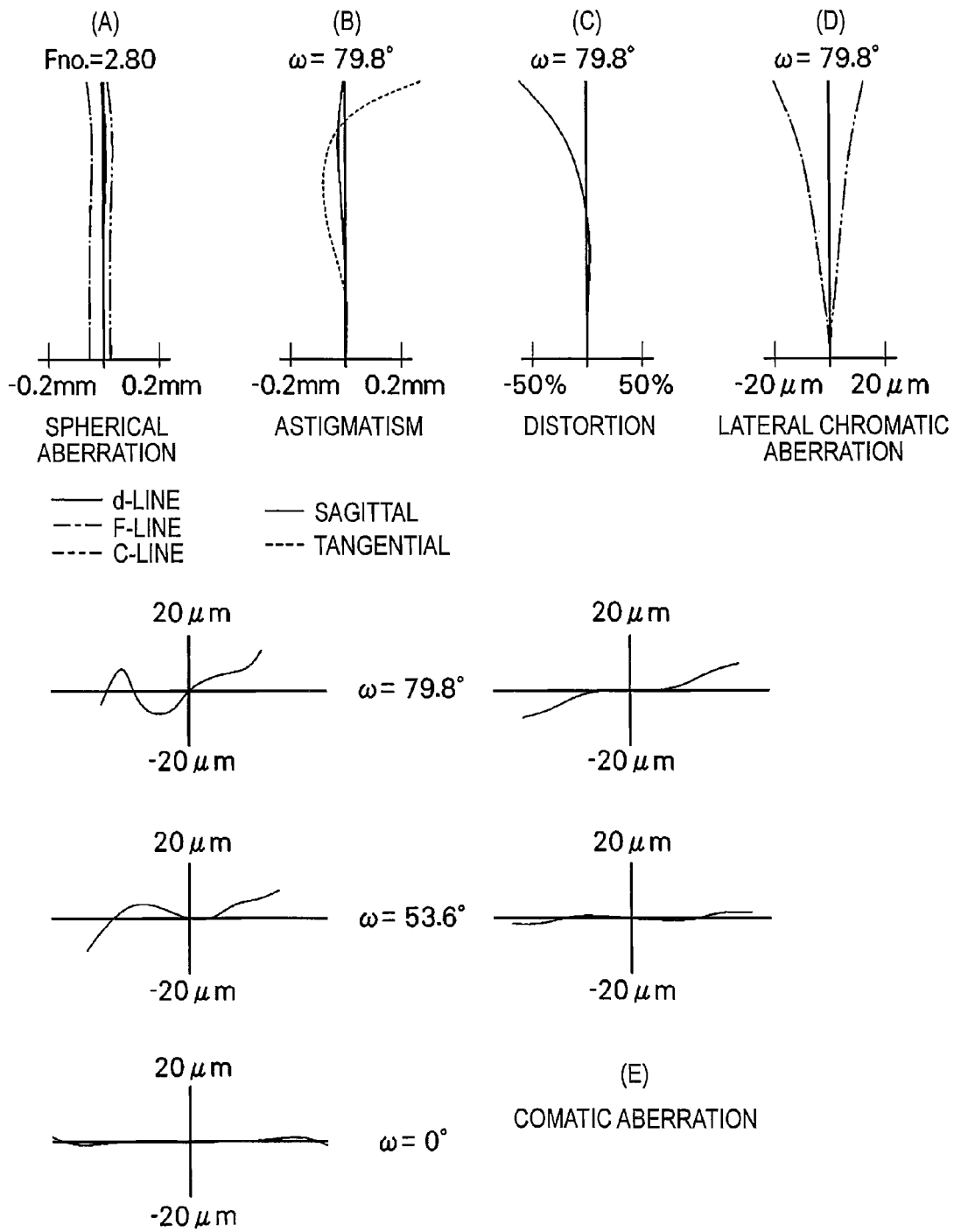
FIG. 14 is diagrams illustrating various diagrams of the imaging lens according to Example 5 of the invention.
Figure 15:
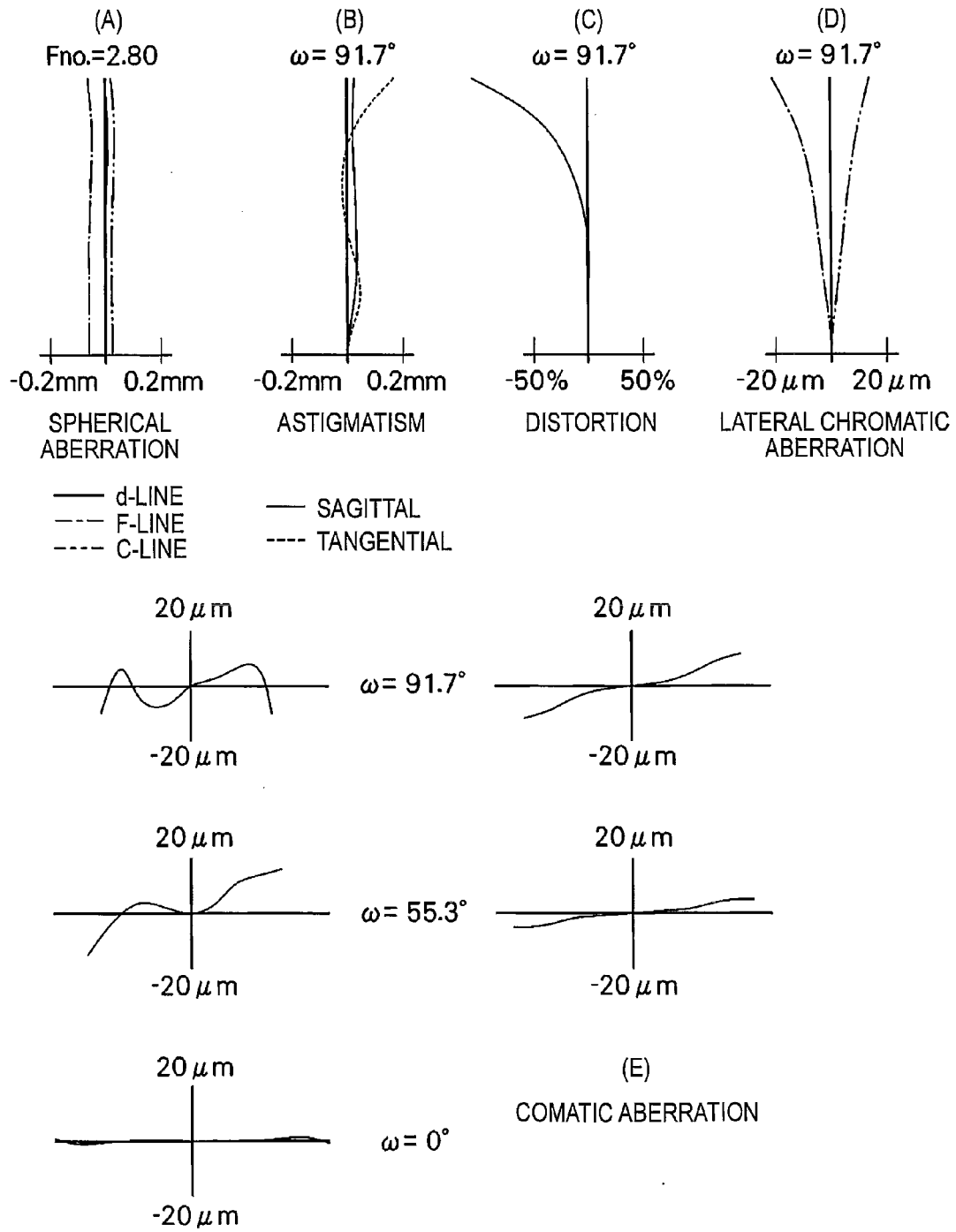
FIG. 15 is diagrams illustrating various diagrams of the imaging lens according to Example 6 of the invention.
Figure 16:
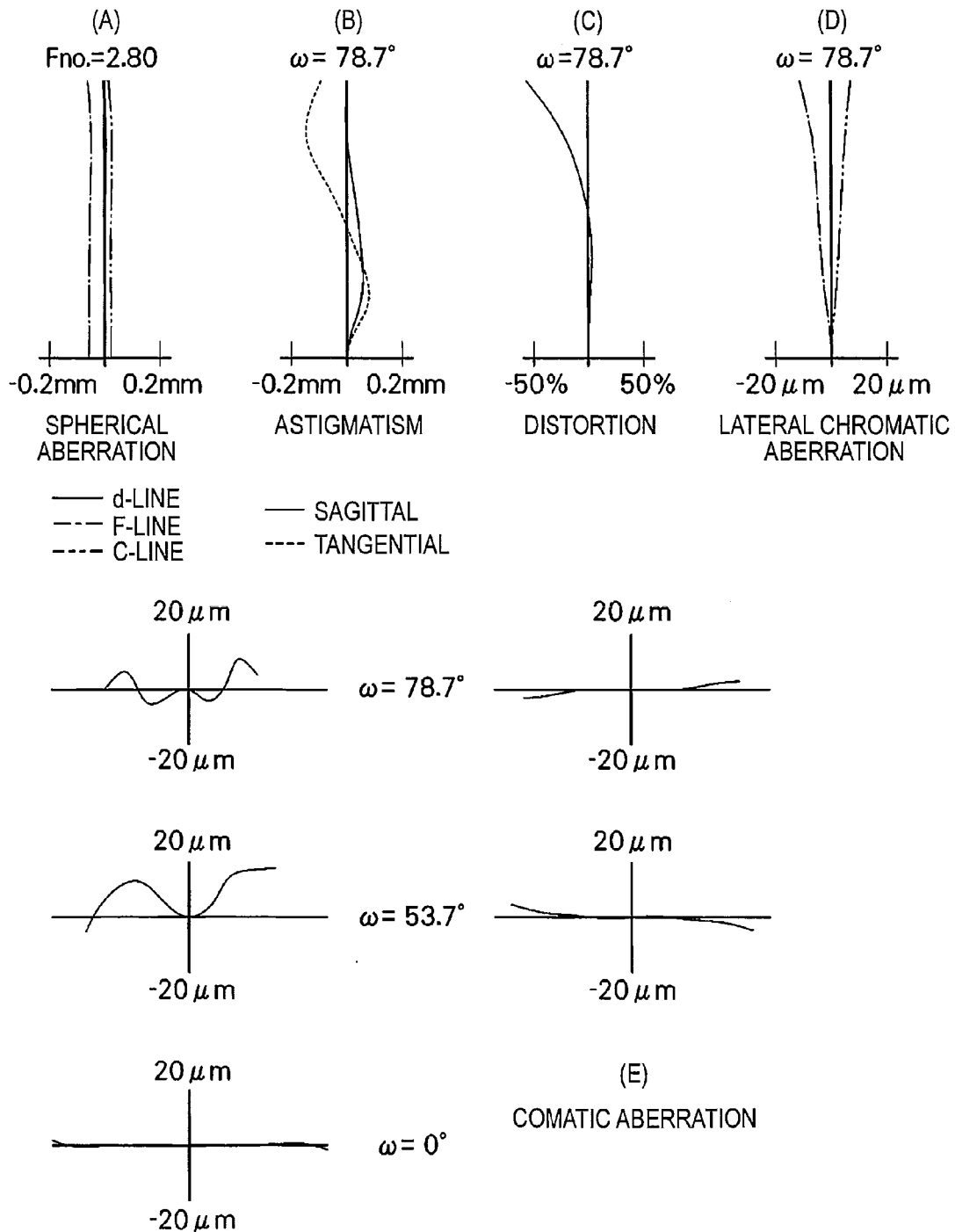
FIG. 16 is diagrams illustrating various diagrams of the imaging lens according to Example 7 of the invention.

Likewise, FIG. 11 ((A) to (E)), FIG. 12 ((A) to (E)), FIG. 13 ((A) to (E)), FIG. 14 ((A) to (E)), FIG. 15 ((A) to (E)), and FIG. 16 ((A) to (E)) show aberration diagrams of spherical aberrations, astigmatism, distortions (distortion aberration), lateral chromatic aberrations, and comatic aberrations of the imaging lenses according to Examples 2 to 7. As can be seen from the aberration diagrams, the aberrations in Examples 1 to 7 are satisfactorily corrected in the visible part of the spectrum.

As described above, each of the imaging lenses according to Examples 1 to 7 has a small number of lenses, for example, four lenses, and is made of plastic, and thus it is possible to manufacture the lens system with a small size and low costs. In addition, the imaging lenses are configured so that the total angle of view is a wide angle of 150 degrees or more, and thus has a small F number of 2.8 and has a favorable optical performance by satisfactorily correcting the aberrations. These imaging lenses are applicable to surveillance cameras, on-board cameras for taking a picture of the front, the side, and the rear of a vehicle, and the like.

(Embodiment of Imaging Apparatus)

Figure 17:
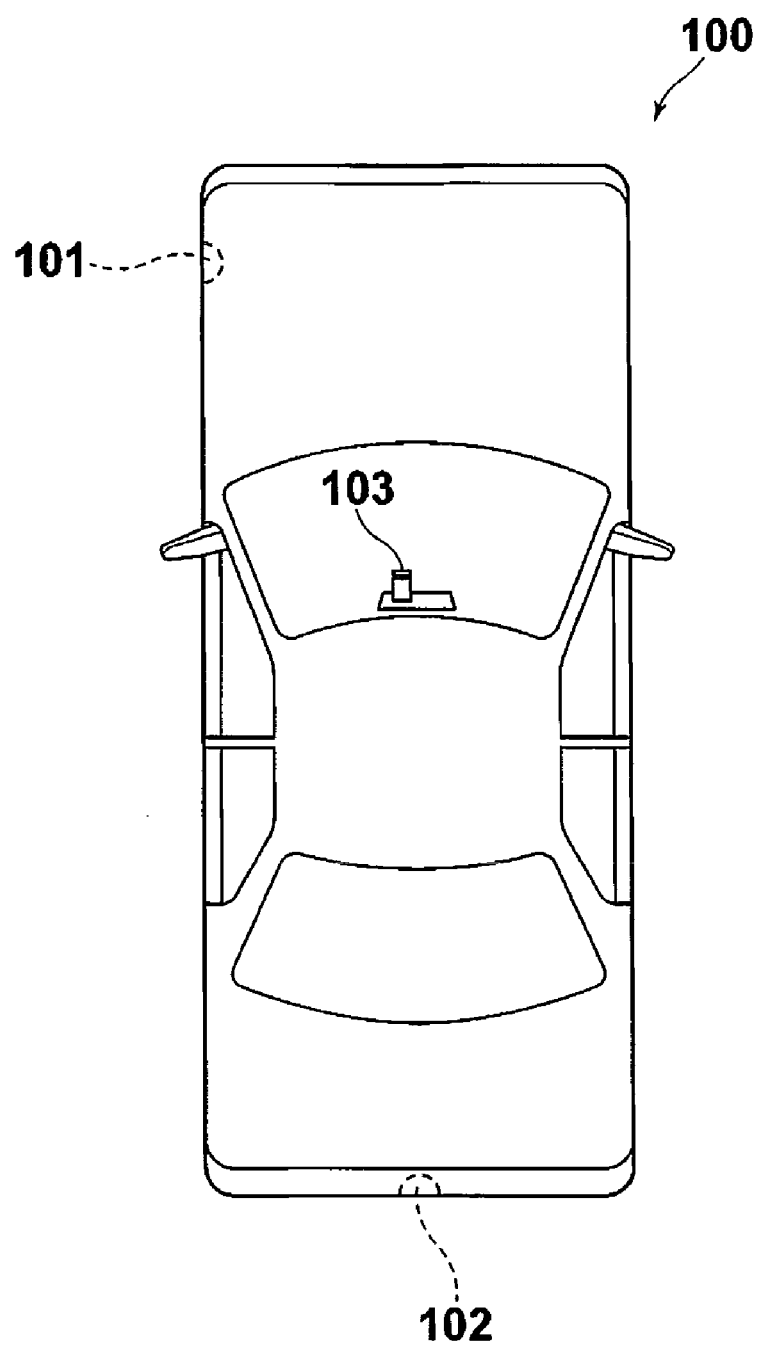
FIG. 17 is a diagram illustrating arrangement of an on-board imaging apparatus according to an exemplary embodiment of the invention.

FIG. 17 shows, as a usage example, a feature of a vehicle 100 equipped with an imaging apparatus having the imaging lens according to the embodiment. In FIG. 17, the vehicle 100 includes an outside-vehicle camera 101 for photographing a blind spot area of the passenger seat side, an outside-vehicle camera 102 for photographing a blind spot area of the rear of the vehicle 100, and an in-vehicle camera 103 disposed on the rear of a room mirror and for photographing the same visual field range as a driver. The outside-vehicle camera 101, the outside-vehicle camera 102, and the in-vehicle camera 103 are the imaging apparatuses, and include the imaging lens according to the embodiment of the invention and the imaging device converting an optical image formed by the imaging lens into an electric signal.

The imaging lenses according to the examples of the invention have the above-mentioned advantages. Hence, it is possible to form the outside-vehicle cameras 101 and 102 and the in-vehicle camera 103 with a small size and low costs, it is possible to take an image with a wide angle of view, and it is possible to obtain a fine picture.

Figure 18:
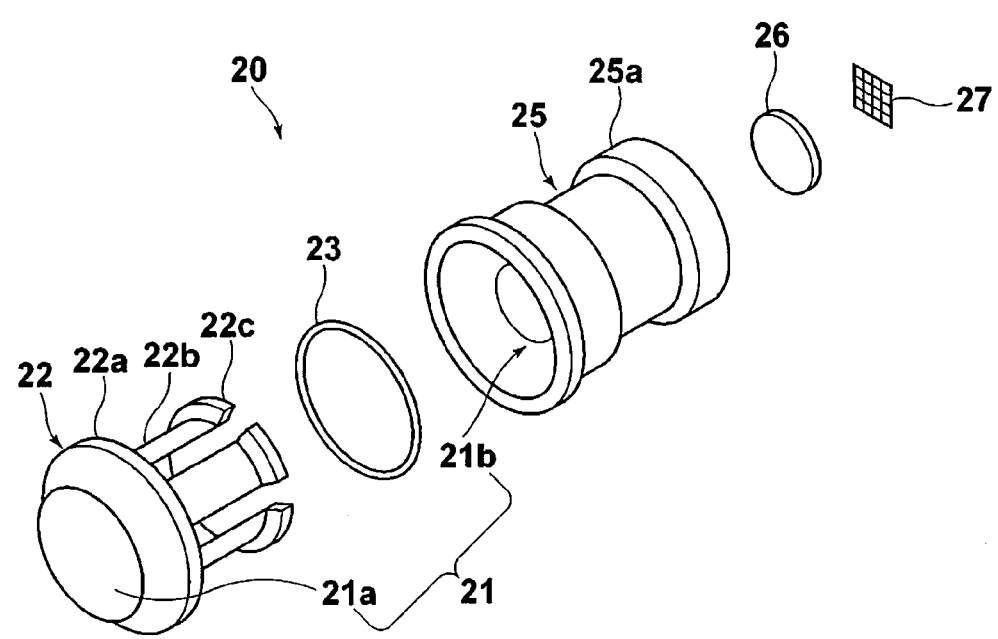
FIG. 18 is an exploded perspective view illustrating a schematic configuration of an outside-vehicle camera according to an exemplary embodiment of the invention.
Figure 19:
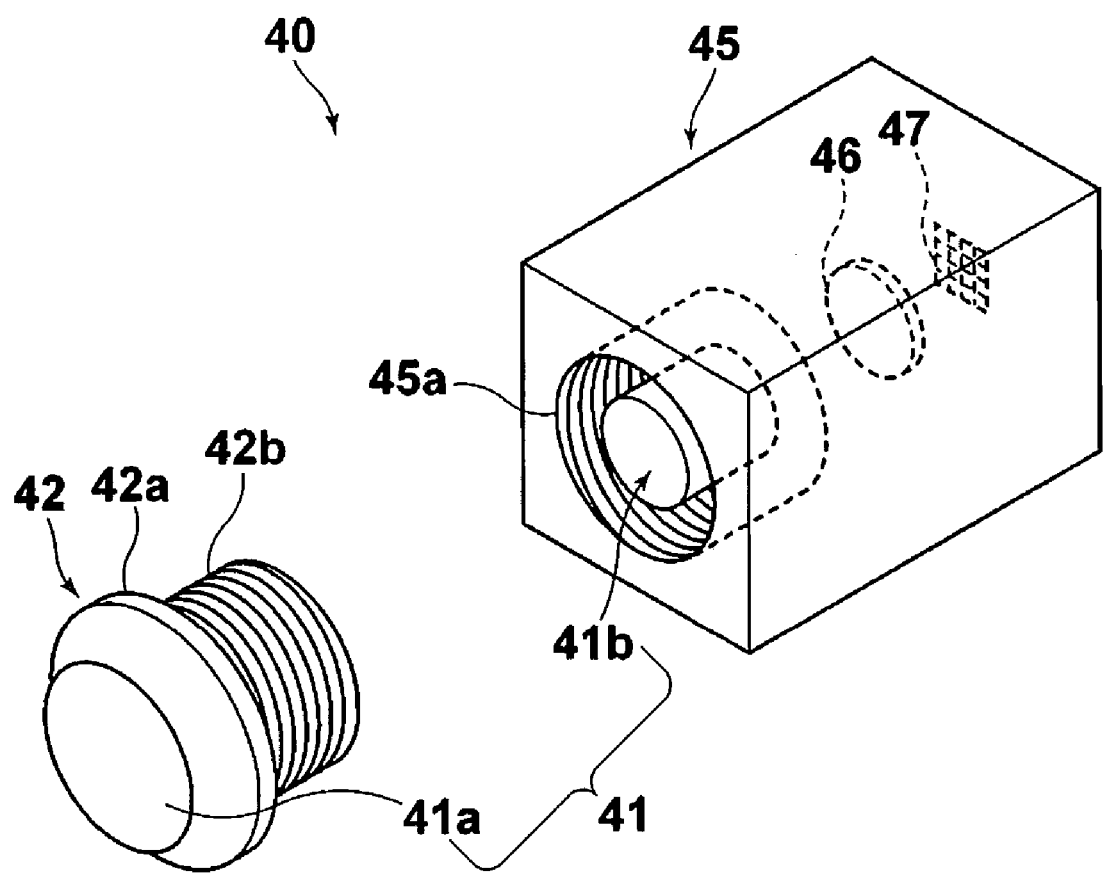
FIG. 19 is a perspective view illustrating a schematic configuration of a surveillance camera according to an exemplary embodiment of the invention.

As described above, the first lens closest to the object side of the imaging lens is set so that the power thereof decreases. Hence, the position accuracy is relaxed, and thus it becomes easy to replace the first lens and perform repair with the first lens detached. FIGS. 18 and 19 show an example of the imaging apparatus configured so that the first lens L1 is detachable. In such a configuration, when only the first lens is damaged, it is not necessary to replace the whole imaging lens, and only the first lens may be replaced.

FIG. 18 shows an example in which the imaging lens 21 according to the embodiment of the invention is applied to an outside-vehicle camera 20 as an imaging apparatus, and is an exploded view illustrating a schematic configuration of the principal part of the outside-vehicle camera 20. The imaging lens 21 includes a first lens 21a configured to be detachable and a lens 21b closer to the image side than the first lens 21a. FIG. 18 shows the image side lens 21b as one body, but for example when the imaging lens 21 has the four-element configuration shown in FIG. 1, the image side lens 21b is formed of the second lens, the third lens, and the fourth lens.

The outside-vehicle camera 20 has the imaging lens 21, a supporting member 22 for supporting the first lens 21a, an O ring 23, a barrel 25 for supporting the image side lens 21b, a filter 26, and an imaging device 27.

The supporting member 22 is for supporting the first lens 21a and mounting the first lens 21a on the barrel 25. The supporting member 22 is provided with a flange portion 22a in which a surface (not shown in the drawings) for pressing the O ring 23 is formed and a hook 22b having a shape in which a plurality of linear legs extends from the flange portion 22a toward the image side in the direction of the optical axis. The hook 22b has flexibility, and the tip end of the hook 22b is formed as an expanded diameter portion 22c having a structure with a level difference.

The O ring 23 is for maintaining airtightness when the first lens 21a is mounted. When the first lens 21a is mounted, the O ring 23 is configured to be housed in the level-difference structure formed inside the barrel 25 and be pressed and attached on the surface of the supporting member 22 for pressing the O ring 23, thereby preventing water and the like from permeating from outside.

Inside the barrel 25, the image side lens 21b is fixed. Further, inside the barrel 25, a tubular passage (not shown in the drawings) through which the hook 22b of the supporting member 22 can be inserted is provided. With such a structure, the supporting member 22 can be mounted on the barrel 25 in a way that the expanded diameter portion 22c of the hook 22b is engaged with an expanded diameter portion 25a formed on the image side end portion of the barrel by inserting the hook 22b of the supporting member 22 through the tubular passage. The supporting member 22 mounted on the barrel 25 is detachable from the barrel 25 in a way that the expanded diameter portion 22c is detached from the expanded diameter portion 25a by using the flexibility of the hook 22b. As described above, since the supporting member 22 is detachable from the barrel 25, the first lens 21a is also detachable from the image side lens 21b. With such a configuration, the first lens 21a is easily replaceable.

A filter 26 is a low-pass filter, an infrared ray cut filter, or the like, and is appropriately selected in accordance with specification of the outside-vehicle camera 20. The imaging device 27 is configured to convert an optical image, which is formed by the imaging lens 21, into an electric signal, and is disposed so that the imaging surface of the imaging device 27 is located at the image position of the imaging lens 21.

Next, an example of the imaging apparatus shown in FIG. 19 is described. FIG. 19 is an example in which an imaging lens 41 according to the embodiment of the invention is applied to a surveillance camera 40 as the imaging apparatus, and is a schematic configuration diagram of the surveillance camera 40. The imaging lens 41 includes a first lens 41a configured to be detachable and a lens 41b closer to the image side than the first lens 41a. FIG. 19 shows, similarly to FIG. 18, the image side lens 41b as one body.

The surveillance camera 40 has the imaging lens 41, a supporting member 42 for supporting the imaging lens 41, a casing 45 for housing the image side lens 41b, a filter 46, and an imaging device 47.

The supporting member 42 is for supporting the first lens 41a and mounting the first lens 41a on the casing 45. The supporting member 42 is provided with a flange portion 42a and a screw portion 42b extending from the flange portion 42a toward the image side in the direction of the optical axis. The inner portion of the screw portion 42b is formed as a cavity having a diameter that allows it to house the image side lens 41b, the outer periphery of the screw portion 42b is formed to have a screw structure.

Inside the casing 45, the image side lens 41b is fixed, and a screw portion 45a for engaging with the screw portion 42b is formed on the inner wall of the casing 45 around the image side lens 41b. By engaging or separating the screw portion 42b into or from the screw portion 45a, the supporting member 42 and the casing 45 are detachable. In addition, since the imaging lens 41 is detachable from a wide-angle imaging lens 44, the first lens 41a is easily replaceable.

A filter 46 is a low-pass filter, an infrared ray cut filter, or the like, and is appropriately selected in accordance with the specification of the surveillance camera 40. The imaging device 47 is configured to convert an optical image, which is formed by the imaging lens 41, into an electric signal, and is disposed so that the imaging surface of the imaging device 47 is located at the image position of the imaging lens 41.

The invention has been described with reference to the embodiment and the examples, but the invention is not limited to the embodiment mentioned above, and may be modified to various forms. For example, the values of a radius of curvature, an on-axis surface spacing, a refractive index, and an Abbe number of the lens components are not limited to the values noted in the numerical examples, and may have other values.

Furthermore, in the above-mentioned examples, all the lenses are made of a homogeneous material, but a gradient index lens may be used. Further, in the above-mentioned examples, the second lens L2 to the fourth lens L4 are formed as refractive lenses having aspheric surfaces, but one or more diffractive optical elements may be formed on one surface or a plurality of surfaces.

Further, in the embodiment of the imaging apparatus, the example in which the invention is applied to the on-board camera has been described with reference to the drawing, but the invention is not limited to this application, and is also applicable to, for example, a camera for a portable terminal, a surveillance camera, and the like.

What is claimed is:

1. An imaging lens comprising: in order from an object side thereof,
   a first lens having a concave surface on an image side thereof;
   a second lens of a negative lens having a concave surface on the image side and having at least one aspheric surface;
   a third lens having at least one aspheric surface;
   a stop;
   a fourth lens of a positive lens having a convex surface on the image side and having at least one aspheric surface,
   wherein the following Conditional Expression (1) is satisfied:

$$15.0 < |f1/f| \tag{1}$$

wherein f represents a focal length of the imaging lens, and f1 represents a focal length of the first lens.

2. The imaging lens according to claim 1, wherein the following Conditional Expression (2) is satisfied:

$$N1 \leq 1.7 \tag{2}$$

wherein N1 represents a refractive index of the first lens at the d-line.

3. The imaging lens according to claim 1, wherein the following Conditional Expression (3) is satisfied:

$$v1 < 60 \tag{3}$$

wherein v1 represents an Abbe number of the first lens at the d-line.

4. The imaging lens according to claim 1, wherein the following Conditional Expression (4) is satisfied:

$$0.2 < |f12/f34| < 1.0 \tag{4}$$

wherein f12 represents a composite focal length of the first lens and the second lens, and f34 represents a composite focal length of the third lens and the fourth lens.

5. The imaging lens according to claim 1, wherein the following Conditional Expression (5) is satisfied:

$$5.0 < |f1/f2| \tag{5}$$

wherein f2 represents a focal length of the second lens.

6. The imaging lens according to claim 1, wherein the second lens has an image side surface having a negative power at a center thereof and a smaller negative power at an effective diameter edge thereof than that at the center.

7. The imaging lens according to claim 1, wherein the following Conditional Expression (6) is satisfied:

$$2.0 < |RX4|/|R4| \tag{6}$$

wherein |R4| represents an absolute value of a radius of curvature at a center of an image side surface of the second lens, and |RX4| represents an absolute value of a radius of curvature of at an effective diameter edge of the image side surface of the second lens.

8. The imaging lens according to claim 1, wherein the following Conditional Expression (7) is satisfied:

$$8.0 < L/f < 13.0 \tag{7}$$

wherein L represents a distance on an optical axis from an object side surface of the first lens to an imaging plane of the imaging lens.

9. The imaging lens according to claim 1, wherein the following Conditional Expression (8) is satisfied:

$$1.0 < Bf/f < 2.5 \tag{8}$$

wherein Bf represents a distance on an optical axis from an image side surface of a lens closest to the image side to the imaging plane of the imaging lens.

10. The imaging lens according to claim 1, wherein the following Conditional Expression (9) is satisfied:

$$0.9 < D1 \tag{9}$$

wherein D1 represents a center thickness of the first lens.

11. An imaging apparatus comprising an imaging lens according to claim 1.

* * * * *